United States Patent
Tsuchiya et al.

[11] Patent Number: 6,122,242
[45] Date of Patent: Sep. 19, 2000

[54] OPTICAL DISC RECORDING/ REPRODUCING APPARATUS RECORDING/ REPRODUCING INFORMATION TO/FROM OPTICAL DISCS ACCORDING TO DIFFERENT STANDARDS

[75] Inventors: Yoichi Tsuchiya, Hashima; Seiji Kajiyama, Gifu; Yasuyuki Kanou, Hashima; Shuichi Ichiura, Hahima, all of Japan

[73] Assignee: Sanyo Electric Co., Ltd., Osaka, Japan

[21] Appl. No.: 09/474,907

[22] Filed: Dec. 29, 1999

Related U.S. Application Data

[60] Division of application No. 08/668,244, Jun. 21, 1996, Pat. No. 6,049,518, which is a continuation-in-part of application No. 08/608,848, Feb. 29, 1996, Pat. No. 5,787,061.

[30] Foreign Application Priority Data

| Aug. 31, 1995 | [JP] | Japan | 7-224395 |
| Oct. 5, 1995 | [JP] | Japan | 7-258894 |
| Dec. 19, 1995 | [JP] | Japan | 7-330576 |
| Apr. 5, 1996 | [JP] | Japan | 8-084307 |

[51] Int. Cl.$^7$ .................................................. G11B 7/00
[52] U.S. Cl. ................................. 369/118; 369/112
[58] Field of Search .................... 369/118, 112, 369/44.23, 54, 58, 110

[56] References Cited

U.S. PATENT DOCUMENTS

| 4,225,873 | 9/1980 | Winslow . |
| 5,150,234 | 9/1992 | Takahashi et al. . |
| 5,281,797 | 1/1994 | Tatsuno et al. . |
| 5,621,719 | 4/1997 | Nomoto . |

FOREIGN PATENT DOCUMENTS

| 0537904 | 4/1993 | European Pat. Off. . |
| 0 731 457 A2 | 9/1996 | European Pat. Off. . |
| 0 742 554 A2 | 11/1996 | European Pat. Off. . |
| 0 747 893 A2 | 12/1996 | European Pat. Off. . |
| 56-019176 | 2/1981 | Japan . |
| 57-158045 | 9/1982 | Japan . |
| 61-167030 | 10/1986 | Japan . |
| 62-24441 | 2/1987 | Japan . |
| 62-275330 | 11/1987 | Japan . |
| 63-175237 | 7/1988 | Japan . |
| 03225650 | 10/1991 | Japan . |
| 04057224 | 2/1992 | Japan . |
| 04195937 | 7/1992 | Japan . |
| 05006546 | 1/1993 | Japan . |
| 05120720 | 5/1993 | Japan . |
| 05303766 | 11/1993 | Japan . |
| 05342618 | 12/1993 | Japan . |
| 06028700 | 2/1994 | Japan . |
| 06028704 | 2/1994 | Japan . |
| 06124477 | 5/1994 | Japan . |
| 07065409 | 3/1995 | Japan . |
| 07182690 | 7/1995 | Japan . |

*Primary Examiner*—Thang V. Tran
*Attorney, Agent, or Firm*—Hogan & Hartson, LLP

[57] ABSTRACT

An optical disc reproducing apparatus includes a semiconductor laser, an objective lens converging a laser beam from the semiconductor laser on a recording surface of an optical disc, a polarization plane rotating unit selectively rotating the plane of polarization of the laser beam according to the thickness of a substrate of the optical disc, and a polarizing filter selectively shading a peripheral portion of the laser beam having the rotated plane of polarization. In one embodiment, a numerical aperture changing unit includes a non-patterned twisted nematic liquid crystal, and the polarizing filter includes a polarizing film having a polarization characteristics at its peripheral portion.

1 Claim, 31 Drawing Sheets

LASER BEAM

— AREA OF DEPOSIT OF SILVER ATOM
---- AREA OF ORIENTATION OF SILVER COMPOUND

27

27

OPTICAL DISC RECORDING/ REPRODUCING APPARATUS RECORDING/ REPRODUCING INFORMATION TO/FROM OPTICAL DISCS ACCORDING TO DIFFERENT STANDARDS

CROSS-REFERENCE TO RELATED APPLICATIONS

This is a division of application Ser. No. 08/668,244 filed Jun. 21, 1996, now U.S. Pat. No. 6,049,518, which in turn is a continuation-in-part of application Ser. No. 08/608,848, filed Feb. 29, 1996, now issued as U.S. Pat. No. 5,787,061, issued Jul. 28, 1998, which application is hereby incorporated by reference in its entirety.

BACKGROUND OF THE INVENTION

1. Field of the Invention

The present invention relates to optical discG recording/reproducing apparatuses, and more particularly, to an optical disc recording/reproducing apparatus capable of recording/reproducing information to/from optical discs having different substrate thicknesses or recording densities.

2. Description of the Background Art

An optical disc reproducing apparatus has been recently provided which reads information recorded on an optical disc having a thickness of approximately 1.2 mm such as a CD (Compact Disc) and a CD-ROM with a semiconductor laser. In such an optical disc reproducing apparatus, focus servo control and tracking servo control are carried out with respect to an objective lens for pickup. A laser beam is directed to a pit train on a recording surface, whereby a signal such as sound, video, and data is reproduced.

In order to record a long motion picture on such an optical disc, a technique of making the recording density high has been progressed in recent years. For example, an SD (Super Density) standard (DVD standard) is proposed which records information for approximately 5 Gbytes on one side of an optical disc having the same diameter as that of a CD-ROM (12 cm). According to the SD standard, the thickness of the optical disc is approximately 0.6 mm. Information for approximately 10 Gbytes can be recorded on one optical disc including two SD specified disc substrates laminated with their signal surfaces therebetween. On the other hand, an MMCD (Multimedia Compact Disc) standard using a one-layered structure is proposed which records information for approximately 3.7 Gbytes on one side of an optical disc having the same diameter as that of the CD-ROM (12 cm). According to the MMCD standard, the thickness of an optical disc is approximately 1.2 mm. Information for approximately 7.4 Gbytes can be recorded on one side of an optical disc according to the MMCD standard using a two-layered structure.

An objective lens for pickup is designed in consideration of the thickness of a substrate of an optical disc to be read and the wavelength of a semiconductor laser to be used. Therefore, an optical disc having the substrate thickness different from the design cannot be read, since the spot of a laser beam is not converged on a recording surface of the optical disc. For example, an objective lens designed to be adapted to an optical disc having a substrate of 1.2 mm in thickness cannot converge the spot of a laser beam on a recording surface of an optical disc having a substrate of 0.6 mm in thickness, and cannot reproduce information recorded on such an optical disc.

Tanaka et al. discloses in Japanese Patent Laying-Open No. 5-303766 an optical head including an aspherical optical element in order to correct aberration caused by the difference in substrate thickness of an optical disc. This optical element may have a function of changing the numerical aperture (NA) of an objective lens.

An objective lens is generally displaced in a direction (tracking direction) perpendicular to the optical axis of a laser beam by tracking control. However, the aperture disclosed by Tanaka et al. is fixed to the optical axis of the laser beam, irrespective of tracking control. Therefore, if the objective lens is displaced in a similar tracking range to that in the case where there is no aperture provided, the deformation of the spot of the laser beam directed to a recording surface increases according to the amount of shift of the optical axis of the objective lens with respect to that of the laser beam. This is because the diameter of the laser beam reduced by the aperture causes a great deformation of the spot of the laser beam, as if the amount of displacement of the objective lens is relatively increased.

Such a beam spot deforms not only in the track direction but also in the tracking direction perpendicular thereto. The deformation of the beam spot in the track direction causes deterioration of jitter. The deformation of the beam spot in the tracking direction causes crosstalk noise. Therefore, an optical disc having a substrate of approximately 1.2 mm in thickness cannot be read stably. Further, an optical disc according to the MMCD standard cannot be read.

In the future, coexistence of an optical disc having the current density and a substrate thickness of approximately 1.2 mm (CD, CD-ROM), an optical disc according to the MMCD standard having a high density and a substrate thickness of approximately 1.2 mm, and an optical disc according to the SD standard having a high density and a substrate thickness of approximately 0.6 mm is expected. The optical discs according to the MMCD and SD standards are referred to as a digital video disc (DVD), in order to be differentiated from the CD and the CD-ROM.

The MMCD and SD are temporary names. They may be changed in the future. In the present application, the MMCD and SD standards are used as determining physical characteristics of an optical disc such as substrate thickness and recording density.

SUMMARY OF THE INVENTION

One object of the present invention is to provide an optical disc recording/reproducing apparatus which can record/reproduce information to/from optical discs having different standards from each other, for example, a digital video disc and a compact disc, stably with one optical pickup device.

According to the present invention, an optical disc recording/reproducing apparatus for irradiating an optical disc with a laser beam to record/reproduce information to/from the optical disc includes a laser, an objective lens, and a numerical aperture changing unit. The laser generates a laser beam to be directed to the optical disc. The objective lens focuses the laser beam from the laser to the optical disc. The numerical aperture changing unit changes the effective numerical aperture of the objective lens according to the thickness of a substrate of the optical disc.

Therefore, this optical disc recording/reproducing apparatus can record/reproduce information to/from optical discs having substrates different in thickness stably.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
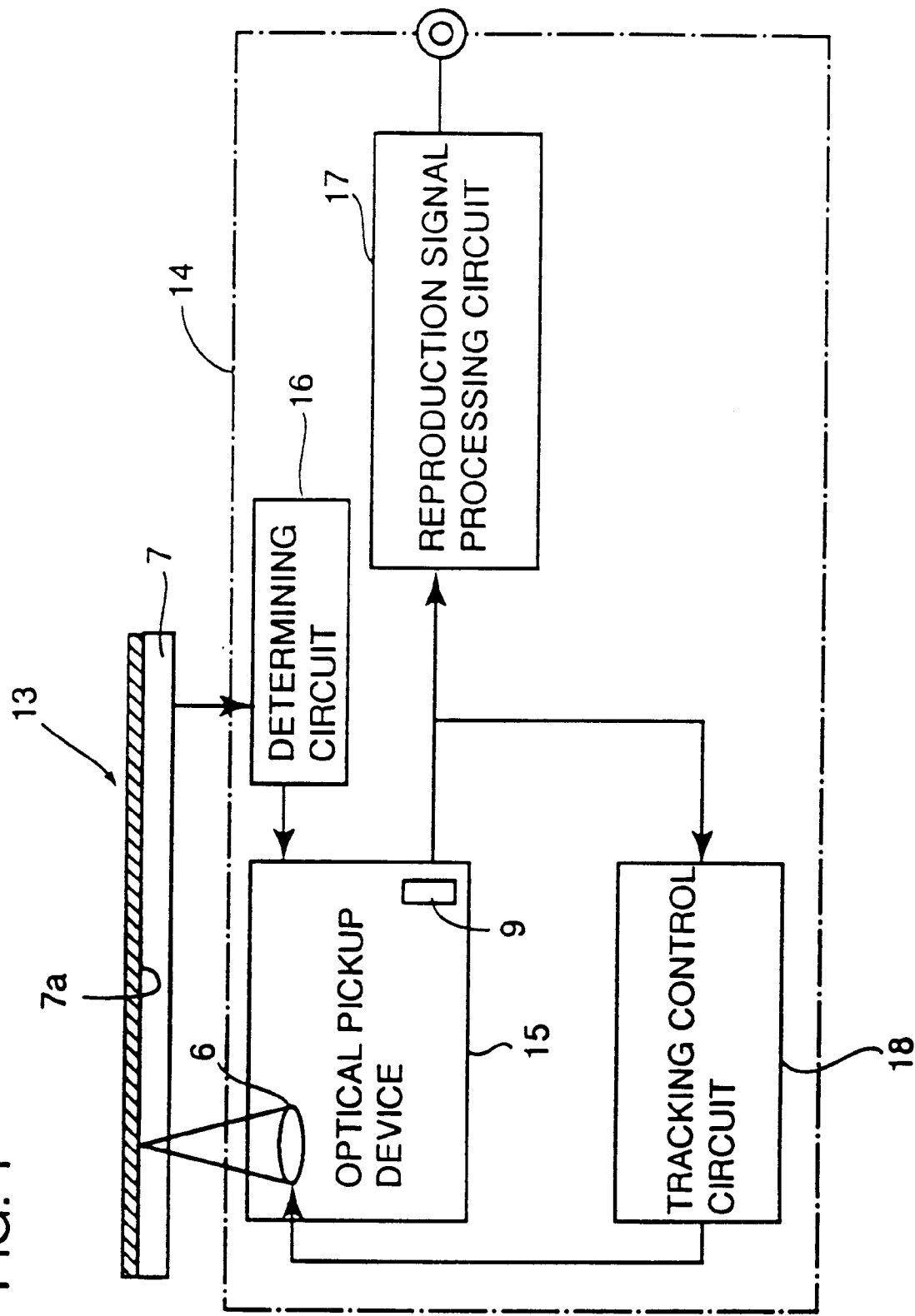
FIG. 1 is a block diagram schematically showing the structure of an optical disc reproducing apparatus according to a first embodiment of the present invention.

Embodiments of the present invention will be described hereinafter in detail with reference to the drawings. In the drawings, the same reference characters denote the same or corresponding portions.

First Embodiment

Table 1 shows rated values and reproduction conditions of two kinds of optical discs which can be read in the optical reproducing apparatus according to the first embodiment.

TABLE 1

|  | DVD (SD) | CD (Standard) |
|---|---|---|
| Rated value |  |  |
| Substrate thickness | 0.6 mm (0.55~0.65 mm) | 1.2 mm (1.1~1.3 mm) |
| Shortest pit length | 0.4 μm (0.3~0.5 μm) | 0.83 μm (0.80~0.90 μm) |
| Track pitch | 0.74 μm (0.73~0.75 μm) | 1.6 μm (1.5~1.7 μm) |
| Reproduction condition |  |  |
| Wavelength | 635 nm (620~650 nm) | |
| Effective numerical aperture | 0.60 (0.55~0.65) | 0.35 (0.30~0.40) |

As is clear from this table, the optical disc reproducing apparatus according to the first embodiment can read both a digital video disc according to the SD standard of a high density and a thin substrate and a compact disc (including a CD-ROM) of a standard density and a standard substrate thickness. The digital video disc according to the SD standard has a substrate thickness of 0.6 (tolerance range 0.55–0.65) mm, the shortest pit length of 0.4 (tolerance range 0.3–0.5) μm, and a track pitch of 0.74 (tolerance range 0.73–0.75) μm. On the other hand, the compact disc has a substrate thickness of 1.2 (tolerance range 1.1–1.3) mm, the shortest pit length of 0.83 (tolerance range 0.80–0.90) μm, and a track pitch of 1.6 (tolerance range 1.5–1.7) μm.

This optical disc reproducing apparatus reads both the digital video disc and the compact disc using a single laser wavelength of 635 (tolerance range 585–685, preferably 620–650) nm. Instead of the laser wavelength of 635 nm, a laser wavelength of 650 (tolerance range 600–700, preferably 635–665) nm may be used. In this embodiment, an objective lens is designed to be adapted to the digital video disc. The numerical aperture of the objective lens is set to 0.60 (tolerance range 0.55–0.65) for the digital video disc. The luminous flux of a laser beam is diaphragmed in reading of the compact disc so that the effective numerical aperture of the objective lens is changed to 0.35 (tolerance range 0.30–0.40) for the compact disc.

Referring to FIG. 1, an optical disc reproducing apparatus 14 of the first embodiment includes an optical pickup device 15 picking up information recorded on an optical disc 13, a determining circuit 16 determining the thickness of a substrate 7 of optical disc 13, a reproduction signal processing circuit 17 processing a reproduction signal from optical pickup device 15, and a tracking control circuit 18 carrying out tracking control for an actuator (not shown) in optical pickup device 15 in response to a tracking error signal from optical pickup device 15.

Figure 2:
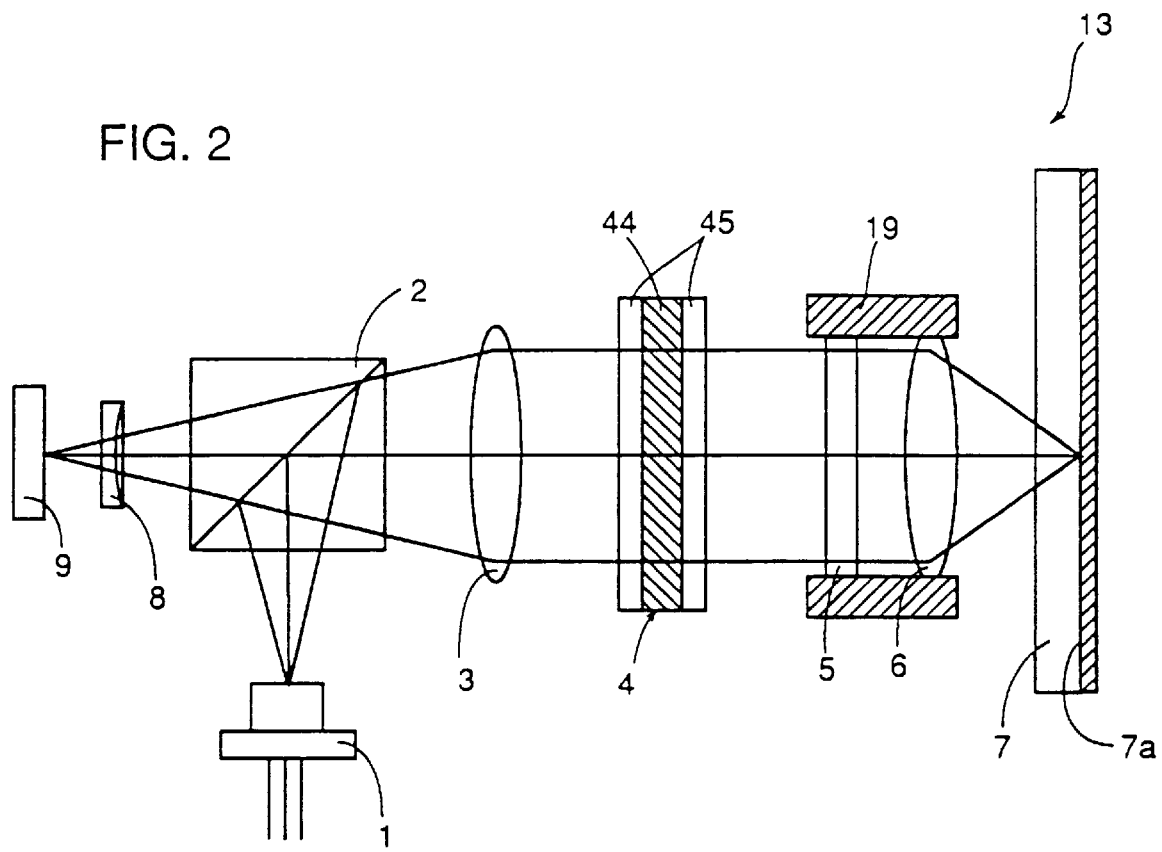
FIG. 2 is a schematic diagram showing the optical structure of an optical pickup device in FIG. 1.

As shown in FIG. 2, optical pickup device 15 includes a semiconductor laser 1 generating a laser beam having a wavelength of 635 (tolerance ±15) nm, a half prism 2, a collimator lens 3, a polarization plane rotating unit 4, a polarizing filter 5, an objective lens 6 focusing the laser beam to optical disc 13, a lens holder 19 holding objective lens 6 and polarizing filter 5 together, a condenser lens 8, and a photodetector 9. Therefore, the laser beam from semiconductor laser 1 is reflected by half prism 2, made parallel by collimator lens 3, and enters objective lens 6 through polarization plane rotating unit 4 and polarizing filter 5. Objective lens 6 together with polarizing filter 5 fixed thereto are displaced in the tracking direction by tracking control circuit 18 in FIG. 1, and in its optical axis direction (focus direction) by a focus control mechanism (not shown). The laser beam through objective lens 6 is converged to be directed to a recording surface 7a of optical disc 13 through substrate 7 made of polycarbonate. The laser beam reflected by recording surface 7a enters condenser lens 8 through substrate 7, objective lens 6, polarizing filter 5, polarization plane rotating unit 4, collimator lens 3, and half prism 2. The laser beam passing through condenser lens 8 is converged to be directed to photodetector 9. In response to the directed laser beam, photodetector 9 generates a reproduction signal and a tracking error signal. In this embodiment, objective lens 6 is preferably designed to make small aberration due to difference in thickness of substrate 7.

Polarization plane rotating unit 4 includes a TN (Twisted Nematic) type liquid crystal 44, and two transparent electrode plates 45 sandwiching liquid crystal 44. Since no voltage is applied to transparent electrode plates 45 in reading of the digital video disc, polarization plane rotating unit 4 rotates the plane of polarization of the laser beam by 90°. On the other hand, since a predetermined voltage is applied to transparent electrode plates 45 in reading of the compact disc, polarization plane rotating unit 4 does not rotate the plane of polarization of the laser beam. Therefore, the entering laser beam directly passes through polarization plane rotating unit 4.

Figure 3:
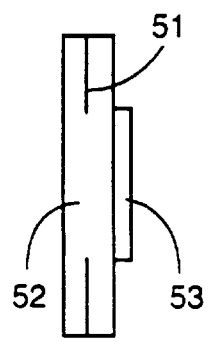
FIG. 3 is a cross-sectional view showing the structure of a polarizing filter in FIG. 2.

As shown in FIG. 3, polarizing filter 5 includes a doughnut-shaped polarizing film 51, two glass plates 52 sandwiching film 51, and a filter 53 having no polarization characteristics laminated on the surface of glass plate 52 on the side of objective lens 6. Polarizing film 51 shades a laser beam having the plane of polarization perpendicular to the surface of paper on which the figure is drawn (hereinafter referred to as a "paper surface"). Therefore, polarizing film 51 transmits a laser beam having the plane of polarization parallel to the paper surface with transmittance of approximately 70 to 90%. When the laser beam having the plane of polarization parallel to the paper surface is directed, if filter 53 is not provided, there could be a difference in transmittance between the central portion and the peripheral portion of polarizing filter 5. In order to avoid this, filter 53 has transmittance of approximately 70 to 90%, and equalizes transmittance of polarizing filter 5 in the entire surface thereof when the laser beam having the plane of polarization parallel to the paper surface is directed. As far as it is transparent and superior in optical characteristics, any material can be used for glass plate 52. Polycarbonate and a resin such as PMMA, for example, may be used instead of glass. Since polarizing filter 5 is fixed to objective lens 6, the lighter polarizing filter 5 is, the more stably tracking control and focus control of objective lens 6 may be carried out.

When a polarizing element having a small difference in transmittance between its central portion and its peripheral portion is used, filter 53 is not required.

Figure 4:
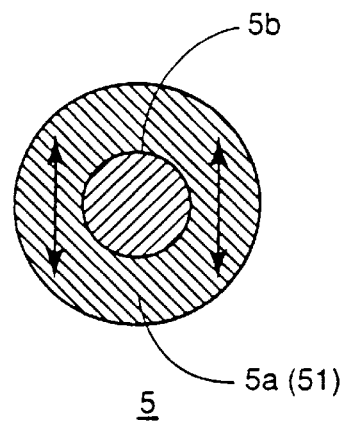
FIG. 4 is a front view of the polarizing filter shown in FIG. 3.

The polarization characteristics of polarizing filter are shown in FIG. 4. A peripheral portion 5a of polarizing filter 5 transmits only a laser beam polarizing in the longitudinal direction of the figure. A central portion (transparent aperture) 5b of polarizing filter 5 transmits a laser beam polarizing in any direction. When the numerical aperture of objective lens 6 is 0.6 (tolerance ±0.05) and the effective diameter of objective lens 6 is 4 mm, the diameter of central portion 5b of polarizing filter 5 is set to 2.3 (tolerance ±0.2) mm so that the effective numerical aperture of objective lens 6 becomes 0.35 (tolerance ±0.05). When the effective diameter of objective lens 6 is other than 4 mm, the diameter of central portion 5b of polarizing filter 5 may be set so that the effective numerical aperture of objective lens 6 is 0.35.

Operation of the first embodiment will now be described. First, determining circuit 16 in FIG. 1 determines the thickness of substrate 7 of optical disc 13 to be read, and applies a determination signal indicating the determined thickness to optical pickup device 15. In response to the determination signal, optical pickup device 15 is adapted so that the laser beam is converged on recording surface 7a of optical disc 13.

Figure 5:
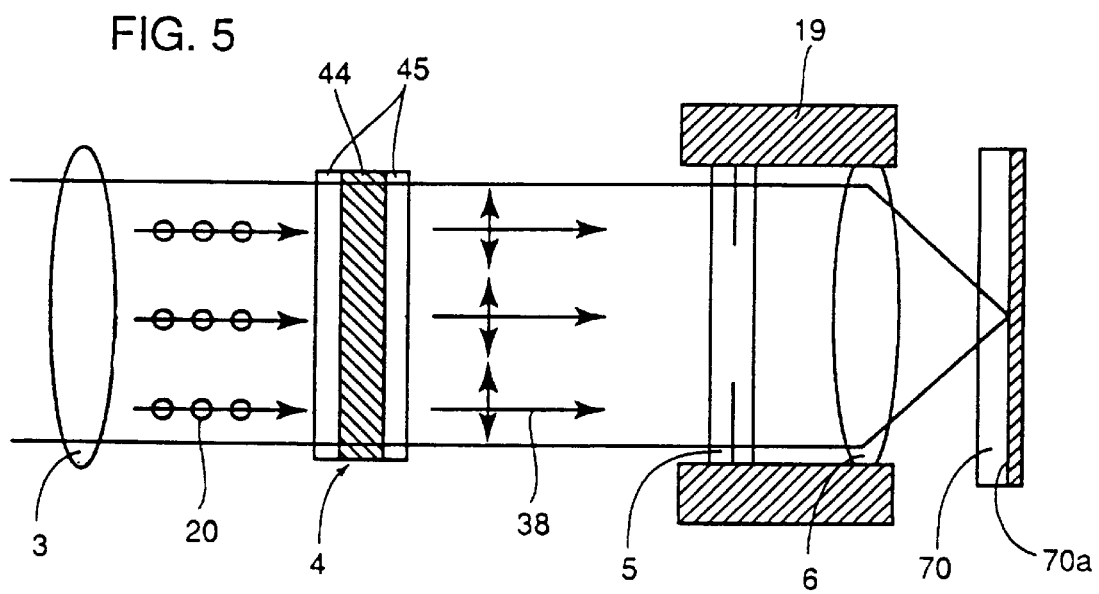
FIG. 5 is a schematic diagram for describing operation when a digital video disc is read using the optical pickup device in FIG. 2.

In reading of the digital video disc according to the SD standard, no voltage is applied to transparent electrode plates 45 of polarization plane rotating unit 4. Therefore, TN type liquid crystal 44 rotates the plane of polarization of the laser beam by 90° as shown in FIG. 5, so that a laser beam 20 having the plane of polarization perpendicular to the paper surface from collimator lens 3 is entirely changed into a laser beam 38 having the plane of polarization parallel to the paper surface. Since the central portion of polarizing filter 5 does not have the polarization characteristic, laser beam 38 passes through the central portion. On the other hand, although the peripheral portion of polarizing filter 5 has the polarization characteristic, the direction of polarization matches that of laser beam 21. Therefore, laser beam 38 passes through both the peripheral portion and the central portion similarly. The entire laser beam 38 enters objective lens 6 without being shaded by polarizing filter 5. The laser beam is converged on a recording surface 70a of a digital video disc 70 by objective lens 6. The diameter of the beam spot formed on recording surface 70a is 0.9 (tolerance ±0.1) μm.

Figure 6:
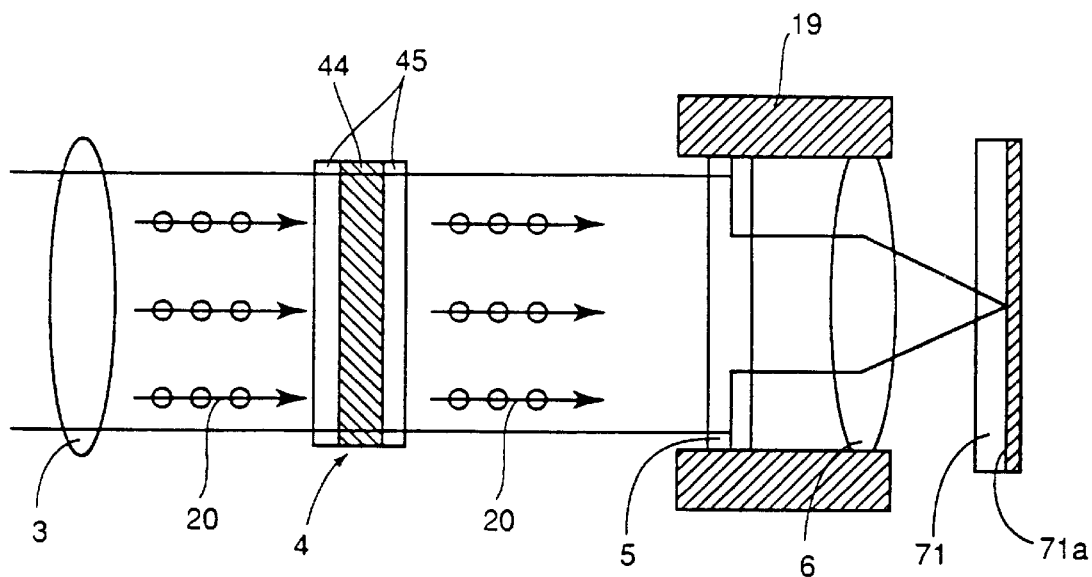
FIG. 6 is a schematic diagram for describing operation when a compact disc is read using the optical pickup device of FIG. 2.

In reading of the compact disc, a predetermined voltage is applied to transparent electrode plates 45 of polarization plane rotating unit 4. Therefore, TN type liquid crystal 44 transmits laser beam 20 directly without rotating its plane of polarization, as shown in FIG. 6. As a result, laser beam 20 from polarization plane rotating unit 4 has the plane of polarization perpendicular to the paper surface, which is the same as that of laser beam 20 from collimator lens 3. Since the central portion of polarizing filter 5 does not have the polarization characteristic, laser beam 20 passes through the central portion. Since the peripheral portion of polarizing filter 5 has the polarization characteristics in the direction perpendicular to laser beam 20, however, laser beam 20 is shaded at the peripheral portion. Therefore, laser beam 20 enters objective lens 6 only through the central portion of polarizing filter 5. This laser beam 20 is converged on a recording surface 71a of a compact disc by objective lens 6. The diameter of the beam spot formed on recording surface 71a is 1.5 (tolerance ±0.1) μm.

Figure 7:
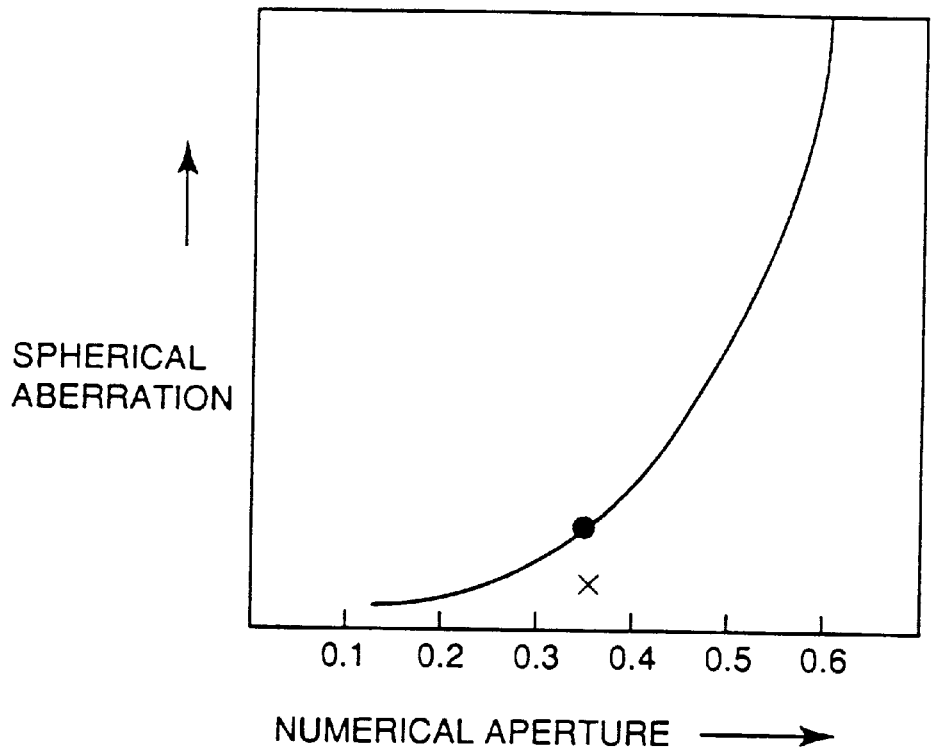
FIG. 7 is a graph showing the relationship between spherical aberration and numerical aperture.
Figure 8:
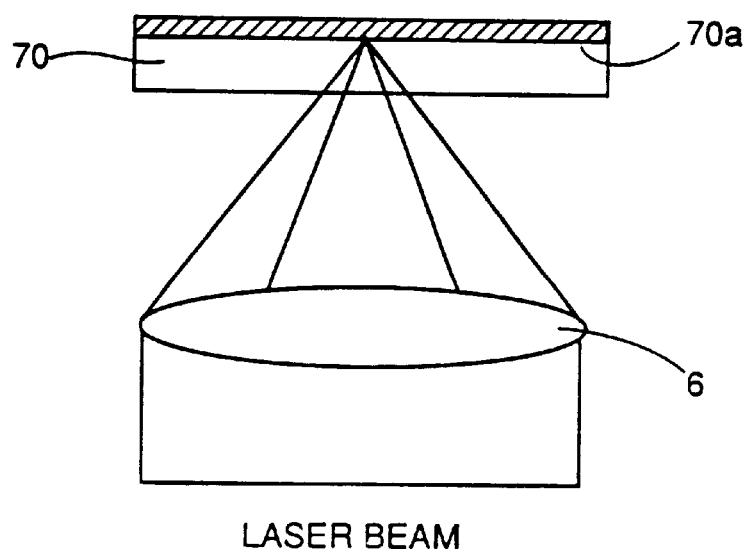
FIG. 8 is a concept diagram of an objective lens having a function of correcting aberration.
Figure 9A:
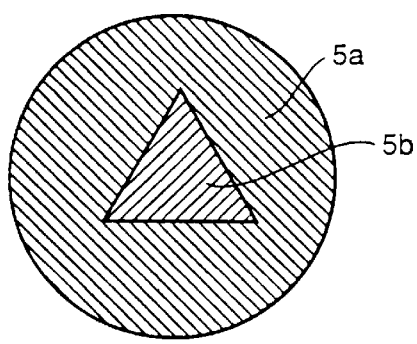
FIGS. 9A to 9G are front views showing other examples of the polarizing filter of FIG. 4.
Figure 9B:
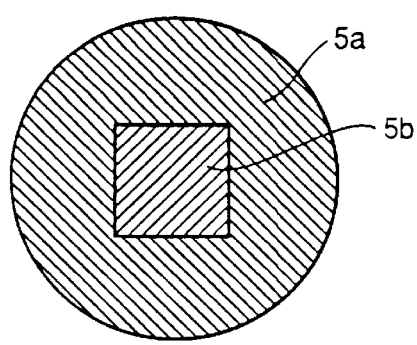
Figure 9C:
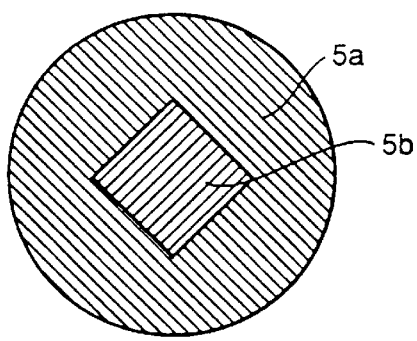
Figure 9D:
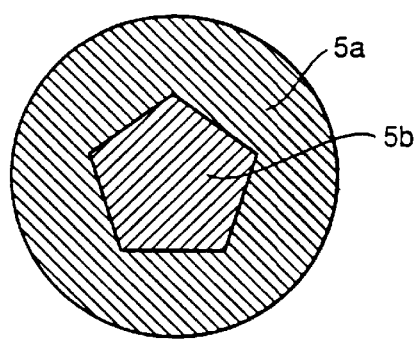
Figure 9E:
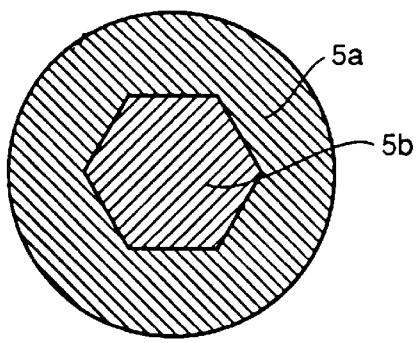
Figure 9F:
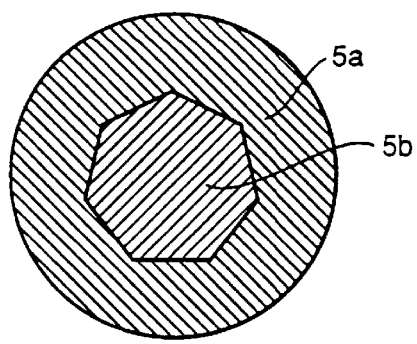
Figure 9G:
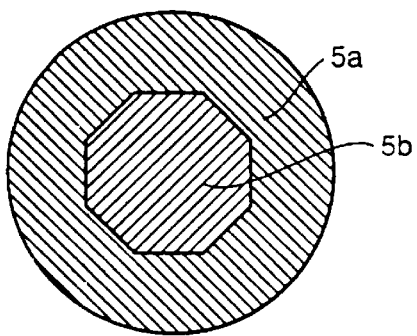
Figure 10A:
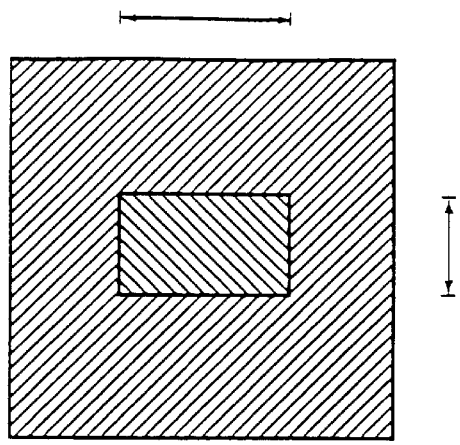
FIGS. 10A to 10D are front views showing further examples of the polarizing filter of FIG. 4.
Figure 10B:
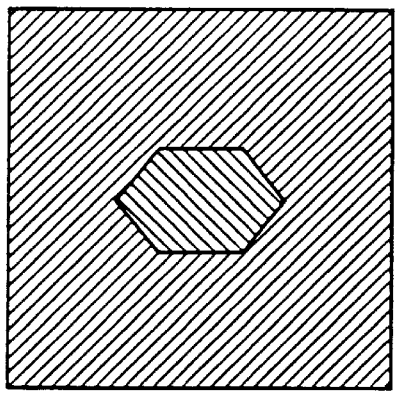
Figure 10C:
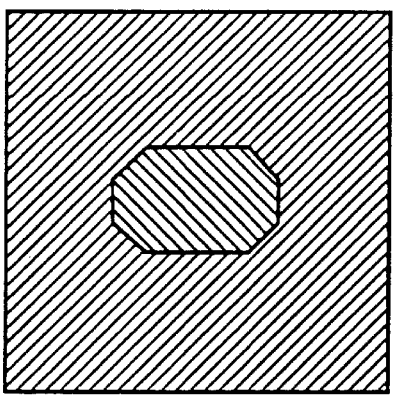
Figure 10D:
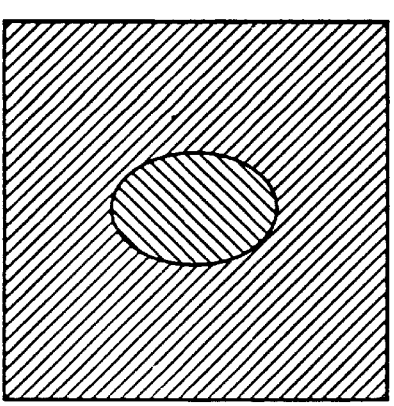

As described above, in the first embodiment, objective lens 6 is designed to be adapted to the digital video disc according to the SD standard having a substrate 70 of 0.6 mm in thickness. Therefore, this objective lens 6 has a numerical aperture of 0.6 (tolerance ±0.05). Generally, as shown in FIG. 7, spherical aberration is proportionate to the biquadratic of the numerical aperture. This is because there is a difference in optical path between a laser beam reaching recording surface 70a through the center of objective lens 6 and a laser beam reaching recording surface 70a through the outermost periphery of objective lens 6, as shown in FIG. 8. Therefore, objective lens 6 is designed so as to minimize such spherical aberration. More specifically, the central portion of objective lens 6 is designed so as to minimize aberration in reading of an optical disc of a little more than 0.6 mm in thickness. Since aberration of the central portion of objective lens 6 in reading of an optical disc of 0.6 mm in thickness becomes a little greater in this case, it is desired that the peripheral portion of objective lens 6 is designed to reduce the aberration.

In reading of a compact disc having a substrate 71 of 1.2 mm in thickness using objective lens 6 designed for a digital video disc, the effective numerical aperture of objective lens 6 is 0.35 (tolerance ±0.05), since polarizing filter 5 shades the laser beam to the peripheral portion of objective lens 6 as described above. Since the laser beam does not enter the peripheral portion of objective lens 6 designed for a digital video disc, objective lens 6 can converge the laser beam on recording surface 71a of the compact disc. Therefore, in reading of the digital video disc, objective lens 6 converges the laser beam incident on its entire portion on recording surface 70a of the digital video disc. In reading of the compact disc, objective lens 6 converges only the laser beam incident on the central portion on recording surface 71a of the compact disc.

As described above, according to the first embodiment, since polarizing filter 5 selectively shades the peripheral portion of the laser beam, the effective numerical aperture of objective lens 6 becomes smaller. As a result, this optical disc reproducing apparatus can read not only the digital video disc but also the compact disc.

Although the optical disc reproducing apparatus according to the first embodiment includes a reflecting mirror for changing the optical path of the laser beam by 90° between collimator lens 3 and polarizing filter 5, this mirror is not shown. This reflecting mirror makes the optical pickup device thin by changing the optical path as described above.

Although the effective numerical aperture of objective lens 6 changes according to the thickness of substrate 7 in the first embodiment, the effective numerical aperture may change according to the recording density instead of the thickness of substrate 7.

In the first embodiment, polarization plane rotating unit 4 is positioned between collimator lens 3 and polarizing filter 5. However, polarization plane rotating unit 4 may be positioned between semiconductor laser 1 and half prism 2, or between half prism 2 and collimator lens 3.

Further, although polarizing filter 5 has a circular transparent aperture at its central portion as shown in FIG. 4, polarizing filter 5 may have a polygonal transparent aperture such as a triangle and an octagon instead of such a circular transparent aperture as shown in FIGS. 9A to 9G.

When polarizing filter 5 is fixed to objective lens 6 as in the above described first embodiment, the optical axis of objective lens 6 always matches the center of the transparent aperture of polarizing filter 5. Therefore, displacement of objective lens 6 in the tracking direction does not cause the luminous flux of the laser beam to change. However, polarizing filter 5 may be provided independently apart from objective lens 6. Polarizing filter 5 is not necessarily fixed to objective lens 6. In this case, objective lens 6 is desirably fixed to the optical axis of the laser beam. If satisfactory reproduction cannot be carried out, the transparent aperture may be extended in the movement direction of objective lens 6. Since objective lens 6 and polarizing filter 5 are displaced in the tracking direction by tracking control circuit 18, the transparent aperture may be longer from side to side as shown in FIGS. 10A to 10D, for example. In the rectangular transparent aperture shown in FIG. 10A, the shorter side is 2.3 mm, and the longer side is 2.5 to 3.3 mm. Further, the transparent aperture may be in asymmetry. Since a CD player carrying out reproduction using the transparent aperture reproduces information from inward to outward of a disc, the transparent aperture is elongated in the outward tracking direction of the disc.

Figure 11A:
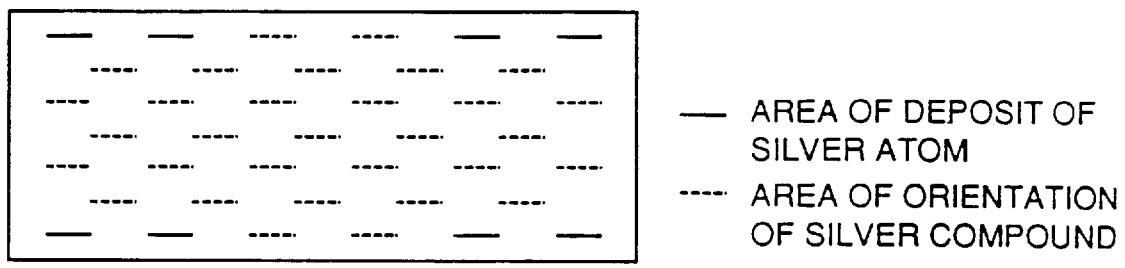
FIG. 11A is a front view for describing polarizing glass.
Figure 11B:
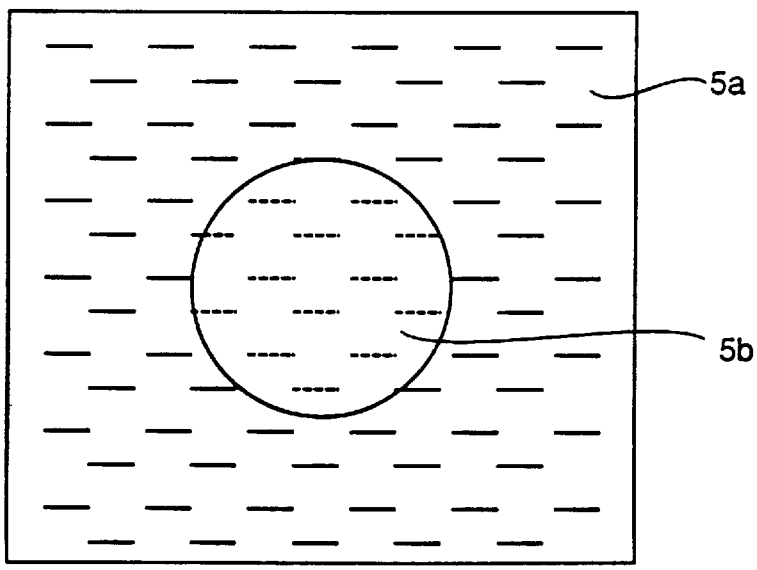
FIG. 11B is a front view of the polarizing glass which can be used instead of the polarizing filter of FIG. 2.

Further, a hologram element having the polarization characteristics or polarizing glass shown in FIGS. 11A and 11B may be used instead of polarizing filter 5. Further, instead of polarizing filter 5, an optical thin film having the polarization characteristics may be formed on the surface of an optical component such as a reflecting mirror positioned between polarization plane rotating unit 4 and objective lens 6.

Polarizing glass is manufactured by orienting silver compounds in glass in a predetermined direction and reducing the surface to deposit silver as shown in FIG. 11A. The reduced silver film has the polarization characteristic.

Therefore, in the polarizing glass used instead of polarizing filter 5, silver only at peripheral portion 5a is deposited, and silver of central portion 5b is not deposited, as shown in FIG. 11B. Therefore, peripheral portion 5a of the polarizing glass has the polarization characteristic, while central portion 5b does not have the polarization characteristic.

Since silver is used for the polarizing glass, the laser beam having the plane of polarization the same as the polarization characteristics of peripheral portion 5a can pass through peripheral portion 5a by 100%. Therefore, it is not necessary to provide filter 53 for decreasing transmittance at the central portion as shown in FIG. 3. Even if the luminous flux of the laser beam is diaphragmed, a sufficient quantity of light can be obtained. It is desirable to use silver as a material for providing the polarizing glass with the polarization characteristic. However, any other metal material may be used as far as it provides the polarization characteristic.

In the above described first embodiment, TN type liquid crystal 44 is used for electrically rotating the plane of polarization. However, an STN (Super Twisted Nematic) type liquid crystal or a ferroelectric liquid crystal may be used instead.

The ferroelectric liquid crystal rotates the plane of polarization of the laser beam by 45° in response to application of a positive voltage in a short time, and maintains such a state. On the other hand, in response to application of a negative voltage in a short time, the ferroelectric liquid crystal rotates the plane of polarization of the laser beam by 45° in the direction opposite to that in application of the positive voltage, and maintains such a state. Therefore, by applying the positive voltage in reading of the digital video disc and the negative voltage in reading of the compact disc, for example, the ferroelectric liquid crystal can rotate the plane of polarization of the laser beam by 90°. Using such a ferroelectric liquid crystal shortens a voltage application time for rotating the plane of polarization, resulting in reduction of power consumption.

Figure 12:
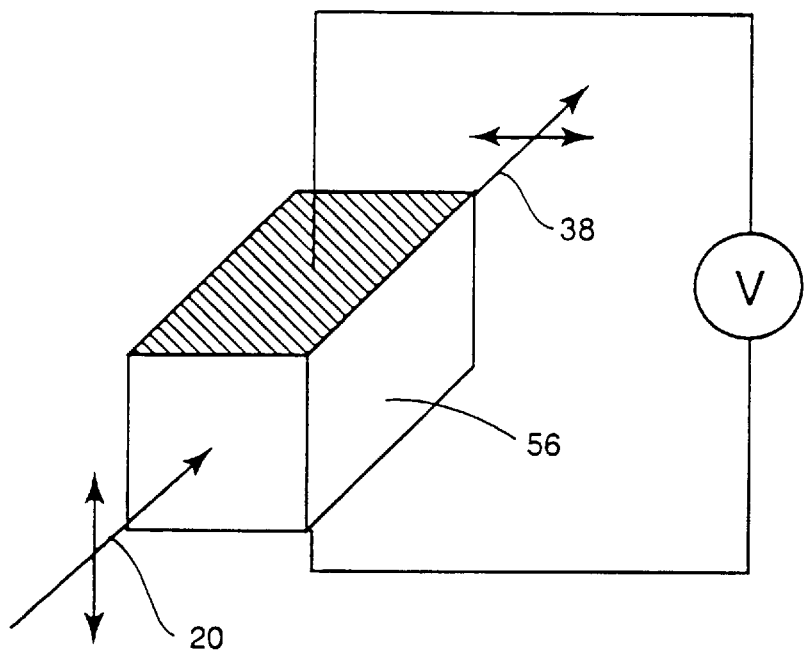
FIG. 12 is a perspective view of a Pockels cell which can be used instead of a TN type liquid crystal in FIG. 2.

A Pockels cell 56 shown in FIG. 12 may be used instead of TN type liquid crystal 44. Pockels cell 56 changes laser beam 20 having the plane of polarization in the longitudinal direction on the figure into laser beam 38 having the plane of polarization in the transverse direction upon application of a predetermined voltage. Since the angle of rotation of the plane of polarization can be changed by adjusting the voltage to be applied, the angle of rotation of the plane of polarization can be adjusted so that an optimal reproduction characteristics can be obtained.

Figure 13:
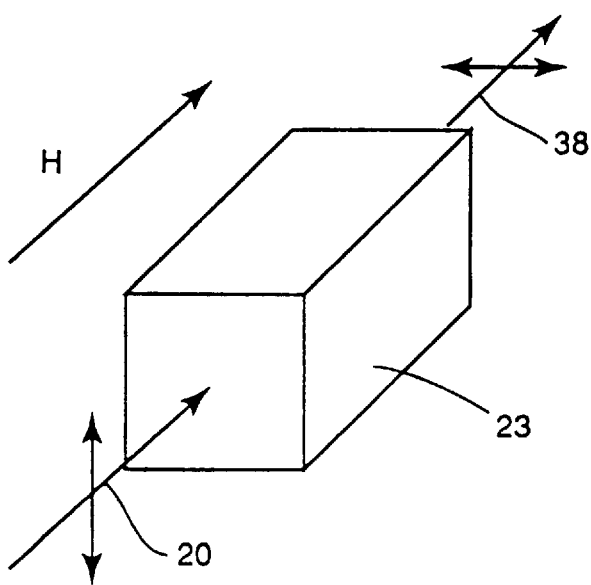
FIG. 13 is a perspective view of a Faraday cell which can be used instead of the TN type liquid crystal in FIG. 2.

A Faraday cell 23 magnetically rotating the plane of polarization shown in FIG. 13 may be used instead of TN type liquid crystal 44. Faraday cell 23 rotates the plane of polarization of the laser beam by 90° in response to application of a magnetic field H. Since the direction of passage of the laser beam matches the direction of application of magnetic field H, a coil is wound around a tube holding Faraday cell 23, for example. Therefore, assembly and structure of Faraday cell 23 can be simplified.

In the above described first embodiment, half prism 2 is used. However, a polarizing beam splitter may be used instead of half prism 2, and a quarter-wave plate may be inserted between polarizing filter 5 and objective lens 6. According to such a structure, the use efficiency of the laser beam is improved.

In the above described embodiment, the laser beam of 635 nm in wavelength is used. However, a laser beam of 650 (tolerance ±15) nm in wavelength may be used. In this case, although the spot diameter of the laser beam increases by approximately 0.1 μm, satisfactory reproduction can be carried out. If the tolerance of wavelength 635 nm is ±50 nm, or if the tolerance of wavelength 650 nm is ±50 nm, satisfactorily reproduction can be carried out.

In the above described first embodiment, objective lens 6 has a numerical aperture of 0.6 so as to be adapted to the digital video disc according to the SD standard. However, if objective lens 6 has a numerical aperture of 0.52 so as to be adapted to the substrate of 1.2 mm in thickness, both the compact disc and the digital video disc according to the MMCD standard can be read. According to the MMCD standard, an optical disc has a substrate of 1.2 (tolerance ±0.05) mm in thickness and a high recording density. In this case, the compact disc can be read even if the effective numerical aperture of objective lens 6 is not 0.35. However, if the effective numerical aperture of objective lens 6 is 0.35, coma generated by the tilt or warp of the substrate is decreased, allowing more favorable reproduction.

In the above described first embodiment, polarizing film 51 transmitting only the laser beam having the plane of polarization parallel to the paper surface is used. However, when the laser beam having the plane of polarization parallel to the paper surface is incident on polarization plane rotating unit 4, a polarizing film transmitting only the laser beam having the plane of polarization perpendicular to the paper surface may be used instead.

Substitution, modification, and the like of the above described components can also be applied to embodiments to be described later.

Second Embodiment

Figure 14:
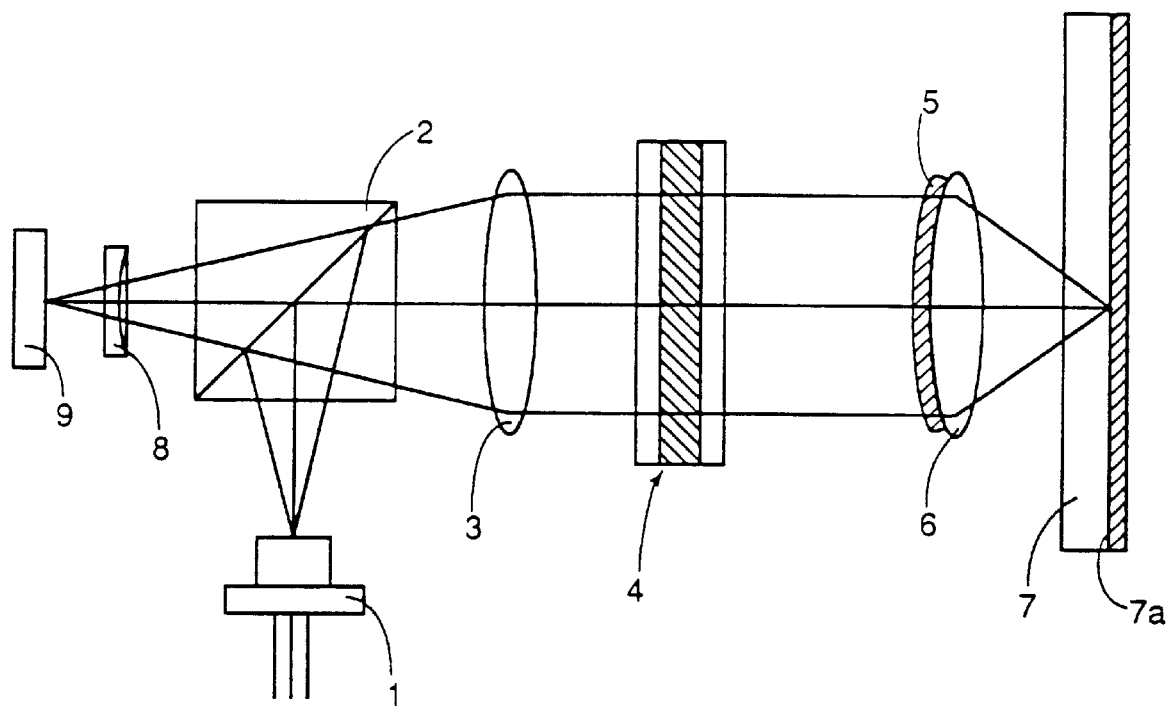
FIG. 14 is a schematic diagram showing an optical system of an optical pickup device in an optical disc reproducing apparatus according to a second embodiment of the present invention.

Referring to FIG. 14, in the optical disc reproducing apparatus according to the second embodiment, polarizing filter 5 in FIG. 2 is laminated on the surface of objective lens 6, whereby polarizing filter 5 is fixed to objective lens 6. The second embodiment is made more compact than the first embodiment. An optical thin film having the polarization characteristics may be formed on the surface of objective lens 6 instead of polarizing filter 5.

Third Embodiment

Figure 15:
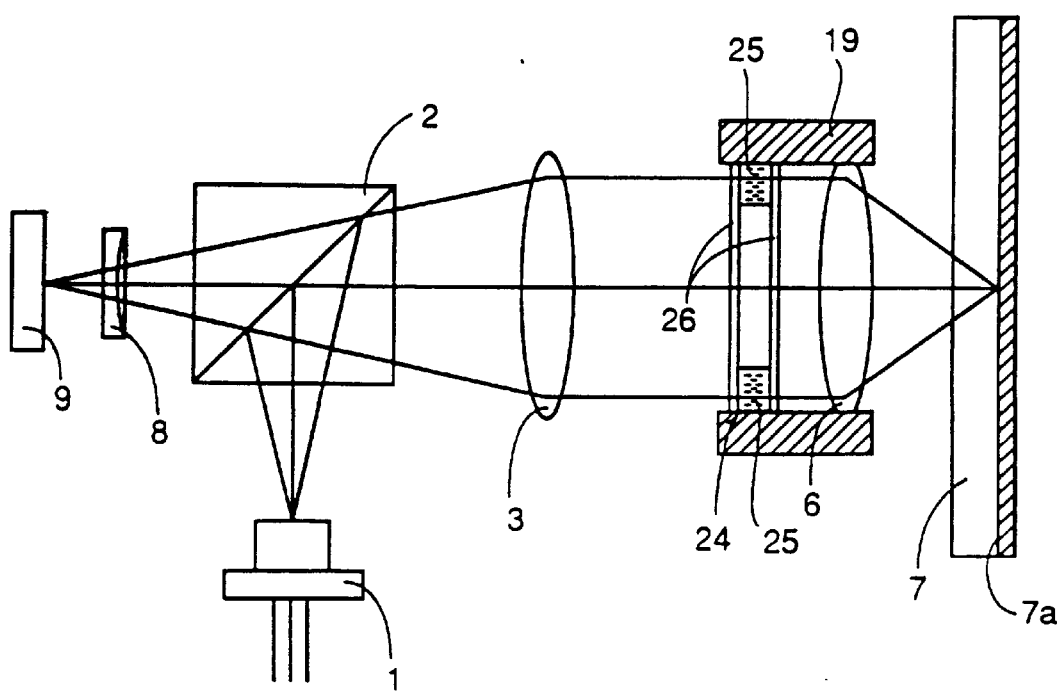
FIG. 15 is a schematic diagram showing an optical system of an optical pickup device in an optical disc reproducing apparatus according to a third embodiment of the present invention.

Referring to FIG. 15, the optical disc reproducing apparatus according to the third embodiment includes a liquid crystal shutter 24 instead of polarization plane rotating unit 4 and polarizing filter 5 in FIG. 2. Liquid crystal shutter 24 includes a doughnut-shaped guest-host type liquid crystal 25 and transparent electrode plates 26 sandwiching liquid crystal 25. Liquid crystal shutter 24 is fixed to objective lens 6 by a lens holder 19.

Figure 16A:
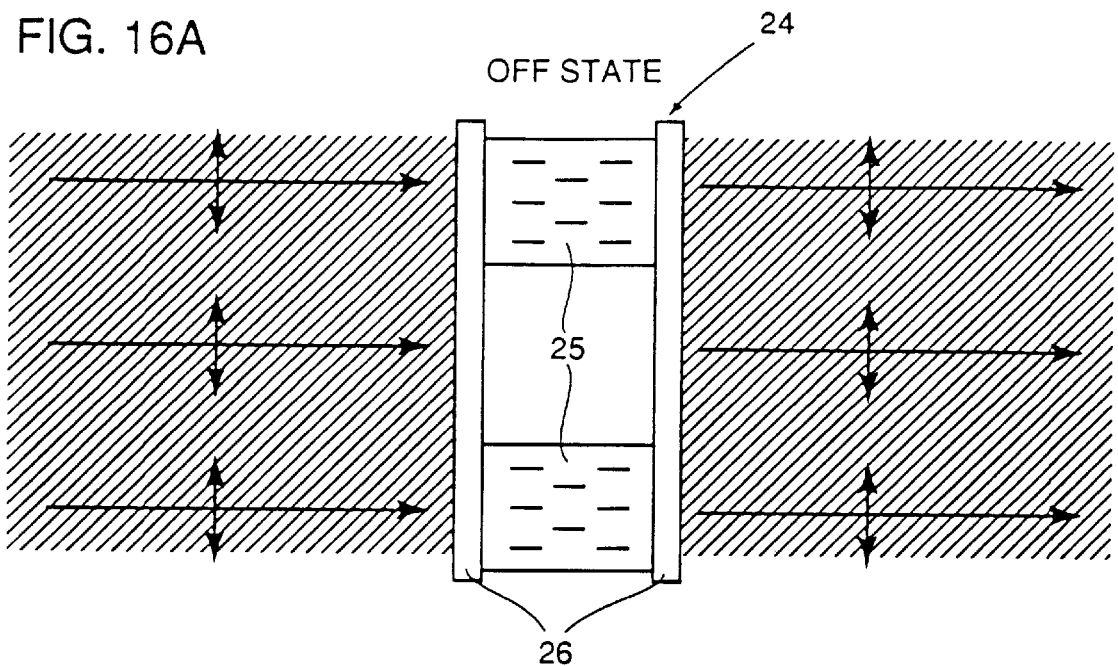
FIG. 16A shows a state where a guest-host type liquid crystal in FIG. 15 is in an off state.
Figure 16B:
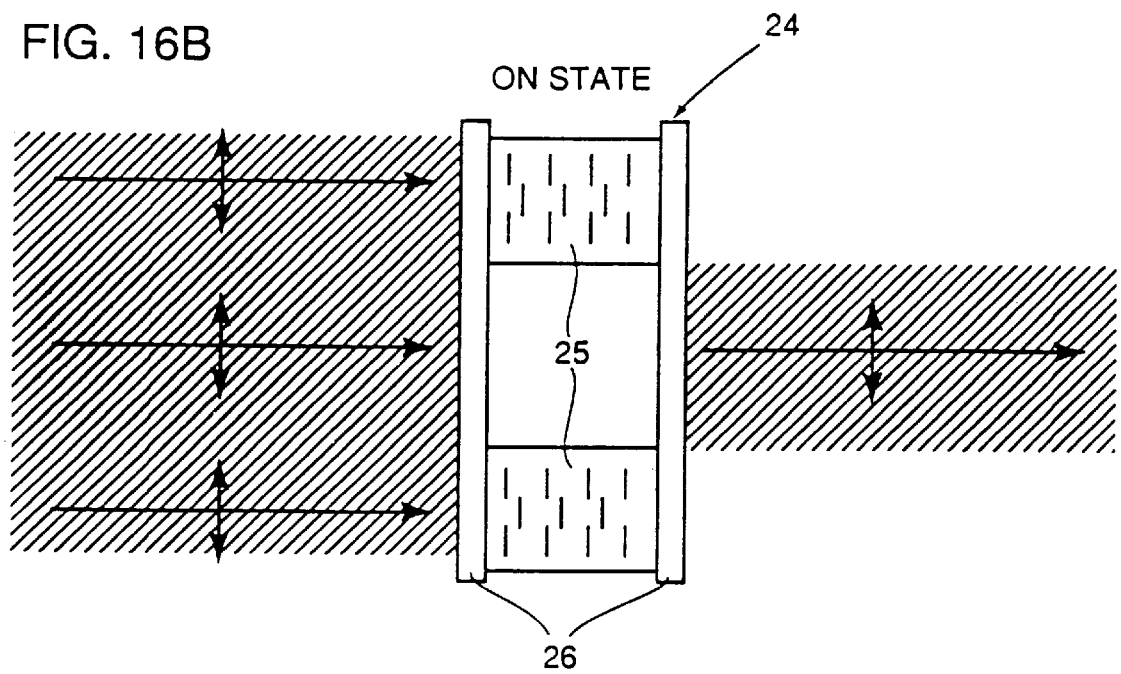
FIG. 16B shows a state where the guest-host type liquid crystal is in an on state.

When guest-host type liquid crystal 25 is in an off state (in reading of the digital video disc) as shown in FIG. 16A, liquid crystal shutter 24 transmits the laser beam as it is. On the other hand, when guest-host type liquid crystal 25 is in an on state (in reading of the compact disc) as shown in FIG. 16B, liquid crystal shutter 24 transmits only the laser beam through the central portion. Liquid crystal shutter 24 shades the laser beam at the peripheral portion by scattering.

Liquid crystal shutter 24 transmits the entire laser beam in reading of the digital video disc, and transmits only the central portion of the laser beam in reading of the compact disc. Therefore, the third embodiment does not require polarizing filter 5 shown in FIG. 2.

Fourth Embodiment

Figure 17:
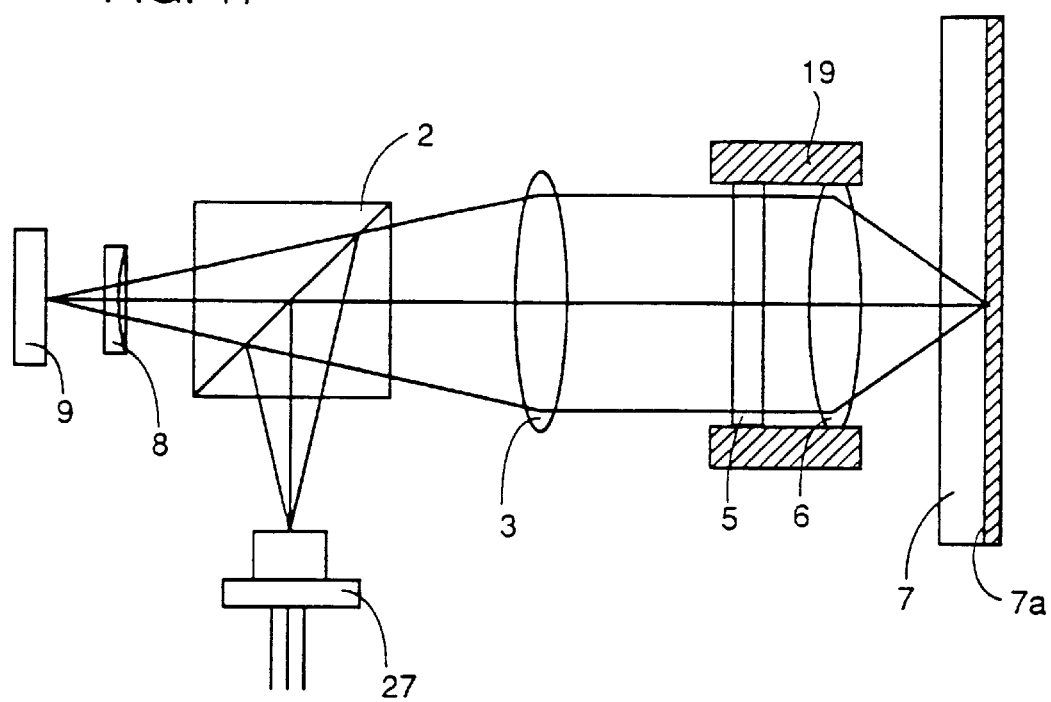
FIG. 17 is a schematic diagram showing an optical system of an optical pickup device in an optical disc reproducing apparatus according to a fourth embodiment of the present invention.

Referring to FIG. 17, the optical disc reproducing apparatus according to the fourth embodiment includes a semiconductor laser 27 which can selectively generate two laser beams different in the plane of polarization. The optical disc reproducing apparatus according to this embodiment does not include polarization plane rotating unit 4 in FIG. 2, unlike the optical disc reproducing apparatus of the first embodiment. This optical disc reproducing apparatus can also read both the digital video disc according to the SD standard and the compact disc.

In reading of the digital video disc, a laser beam having the plane of polarization perpendicular to the paper surface is emitted from semiconductor laser 27 to enter polarizing filter 5 through half prism 2 and collimator lens 3. Polarizing filter 5 transmits the entire laser beam without shading. Therefore, objective lens 6 converges the laser beam on a recording surface of the digital video disc.

On the other hand, in reading of the compact disc, a laser beam having the plane of polarization parallel to the paper surface is emitted from semiconductor laser 27 to enter polarizing filter 5 through half prism 2 and collimator lens 3. Polarizing filter 5 shades the peripheral portion of the incident laser beam and transmits only the central portion of the laser beam. Therefore, objective lens 6 converges the laser beam on a recording surface of the compact disc.

Such semiconductor laser 27 as described above which can selectively generate two laser beams having the planes of polarization orthogonal to each other may be used instead of polarization plane rotating unit 4 of the first embodiment. Several examples of such semiconductor laser 27 will be described hereinafter.

Figure 18:
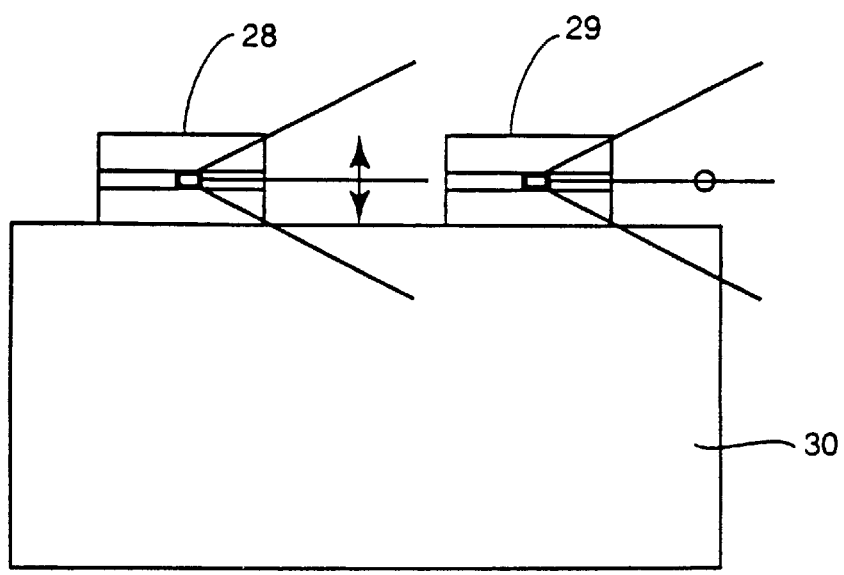
FIG. 18 is a diagram showing one example of a semiconductor laser in FIG. 17.

As shown in FIG. 18, for example, semiconductor laser 27 includes a laser element 28 generating a laser beam polarizing in the longitudinal direction on the figure, another laser element 29 generating a laser beam polarizing in the transverse direction on the figure, and a sub-mount 30 to which both laser elements 28 and 29 are mounted together. For convenience of illustration, the laser beams are emitted rightward in FIG. 18. However, these laser beams are actually emitted toward this side of the paper surface. This is also true in FIGS. 19 and 20. In semiconductor laser 27 shown in FIG. 18, laser elements 28 and 29 are activated alternately.

Figure 19:
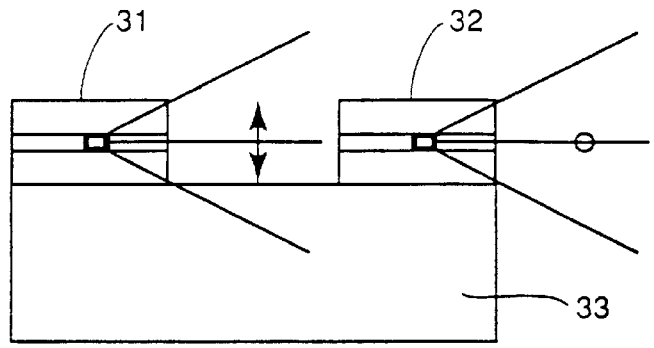
FIG. 19 is a diagram showing another example of the semiconductor laser in FIG. 17.

As shown in FIG. 19, laser elements 31 and 32 having the planes of polarization orthogonal to each other may be formed on a semiconductor substrate 33 integrally.

Figure 20:
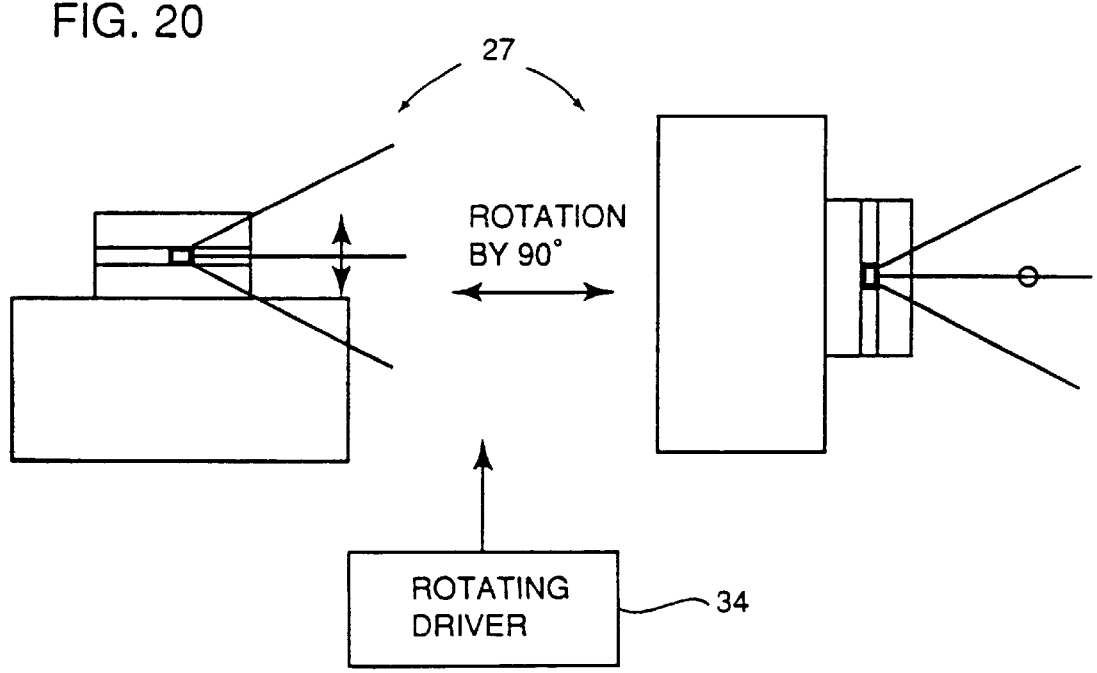
FIG. 20 is a diagram showing still another example of the semiconductor laser in FIG. 17.

As shown in FIG. 20, one semiconductor laser 27 may be rotated by a rotating driver 34 by 90°. Rotating driver 34 includes, for example, a sub-mount (not shown) holding semiconductor laser 27 and a servo motor (not shown) rotating the sub-mount by 90°.

Fifth Embodiment

Figure 21:
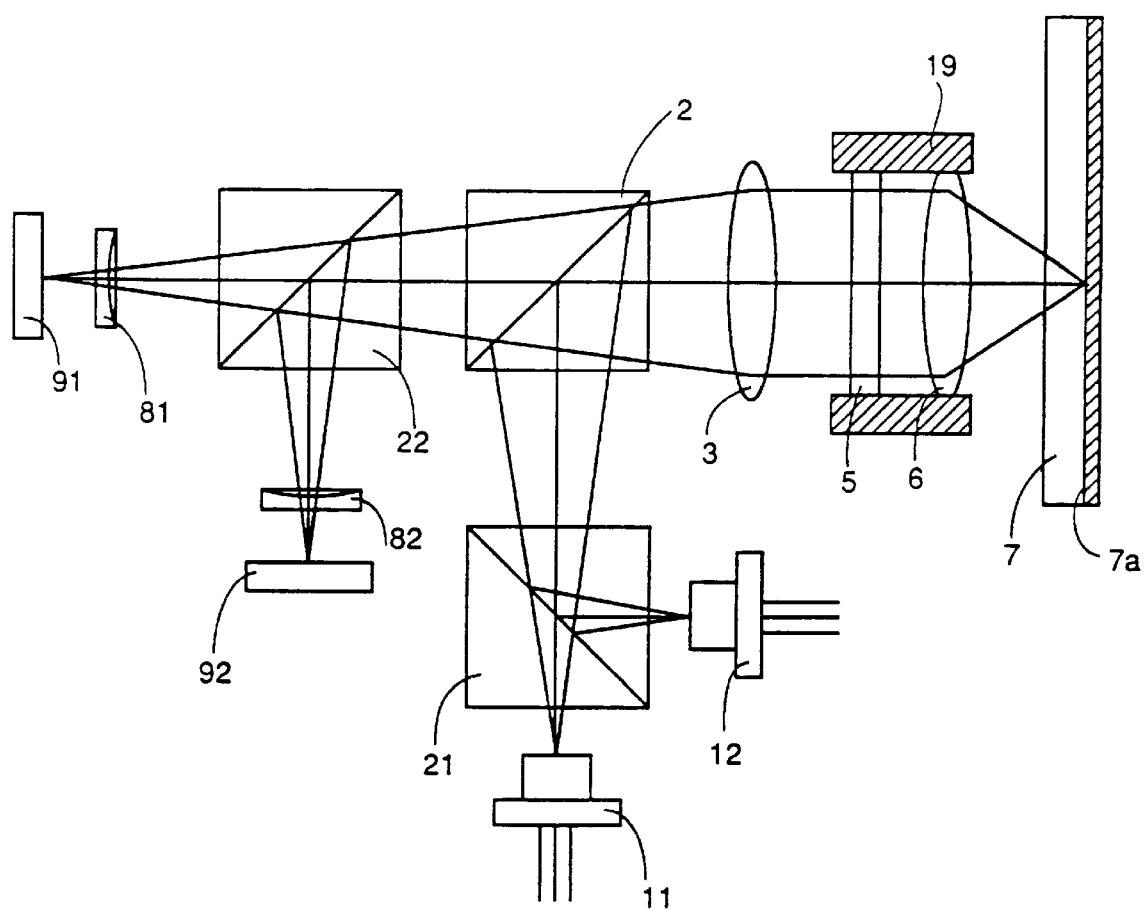
FIG. 21 is a schematic diagram showing an optical system of an optical pickup device in an optical disc reproducing apparatus according to a fifth embodiment of the present invention.

Referring to FIG. 21, the optical disc reproducing apparatus according to the fifth embodiment includes two semiconductor lasers 11 and 12 instead of semiconductor laser 1 in FIG. 2, a polarizing beam splitter 21 focusing laser beams from semiconductor lasers 11 and 12 to half prism 2, two photodetectors 91 and 92 instead of photodetector 9 in FIG. 2, two condenser lenses 81 and 82 instead of condenser lens 8 in FIG. 2, and a polarizing beam splitter 22 focusing the laser beam from half prism 2 to condenser lenses 81 and 82. This optical disc reproducing apparatus does not include polarization plane rotating unit 4 in FIG. 2.

Semiconductor laser 11 generates a laser beam having the plane of polarization parallel to the paper surface. The generated laser beam reaches recording surface 7a of the optical disc through polarizing beam splitter 21. Light reflected from the recording surface of the optical disc reaches photodetector 91 through polarizing beam splitter 22. On the other hand, semiconductor laser 12 generates a laser beam having the plane of polarization perpendicular to the paper surface. The generated laser beam reaches recording surface 7a of the optical disc after reflection from polarizing beam splitter 21. The light reflected from recording surface 7a of the optical disc reaches photodetector 92 after reflection from polarizing beam splitter 22. Since such two semiconductor lasers 11 and 12 are activated alternately, the optical disc reproducing apparatus according to the fifth embodiment can also read both the digital video disc and the compact disc.

According to the fifth embodiment, it is not necessary to position, after positioning the photodetector with respect to semiconductor laser 11, semiconductor laser 12 with respect to the photodetector.

Sixth Embodiment

Figure 22:
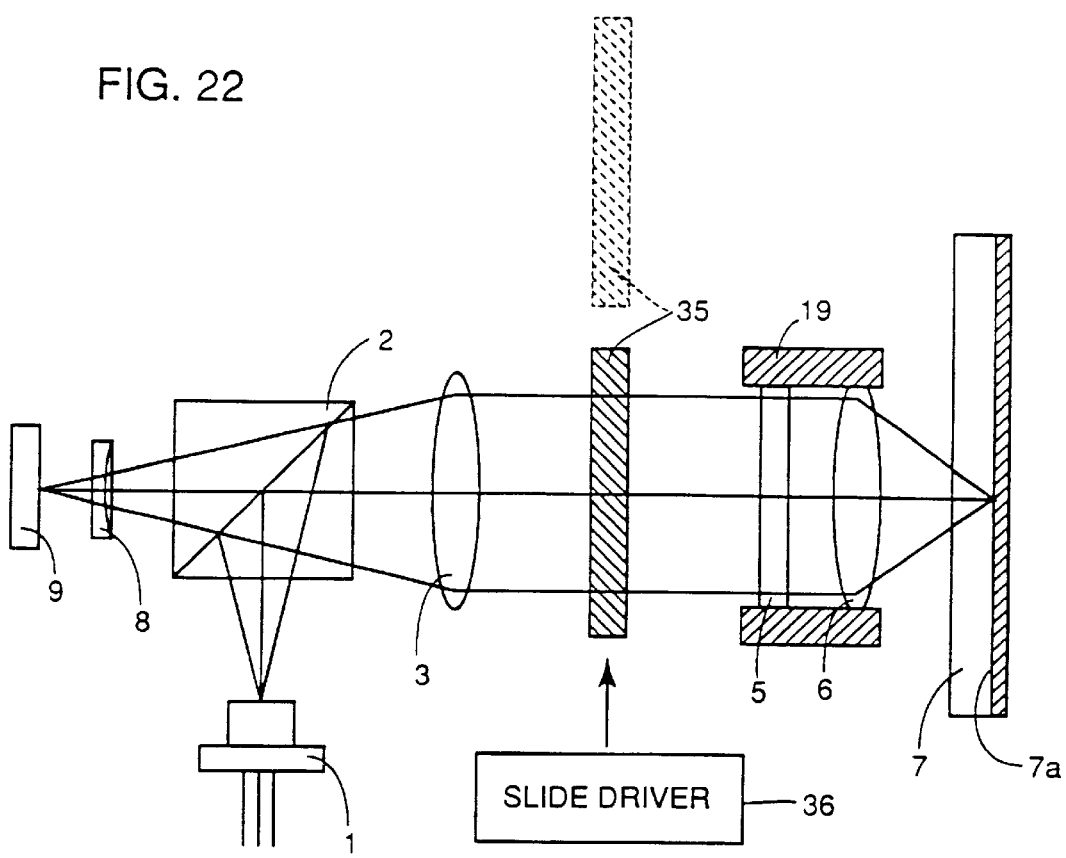
FIG. 22 is a schematic diagram showing an optical system of an optical pickup device in an optical disc reproducing apparatus according to a sixth embodiment of the present invention.

Referring to FIG. 22, the optical disc reproducing apparatus according to the sixth embodiment includes a half-wave plate 35 and a slide driver 36 instead of polarization plane rotating unit 4, unlike the optical disc reproducing apparatus according to the first embodiment. Slide driver 36 inserts half-wave plate 35 in the optical path of the laser beam in reading of the digital video disc, and removes half-wave plate 35 from the optical path in reading of the compact disc. Therefore, when half-wave plate 35 is not inserted in the optical path, the plane of polarization of the laser beam is not rotated. However, when half-wave plate 35 is inserted in the optical path, the plane of polarization of the laser beam is rotated by half-wave plate 35 by 90°. Slide driver 36 includes, for example, a circular plate (not shown) holding half-wave plate 35 and a servo motor (not shown) rotating the circular plate. As described above, half-wave plate 35 may be inserted/removed mechanically.

Seventh Embodiment

Figure 23:
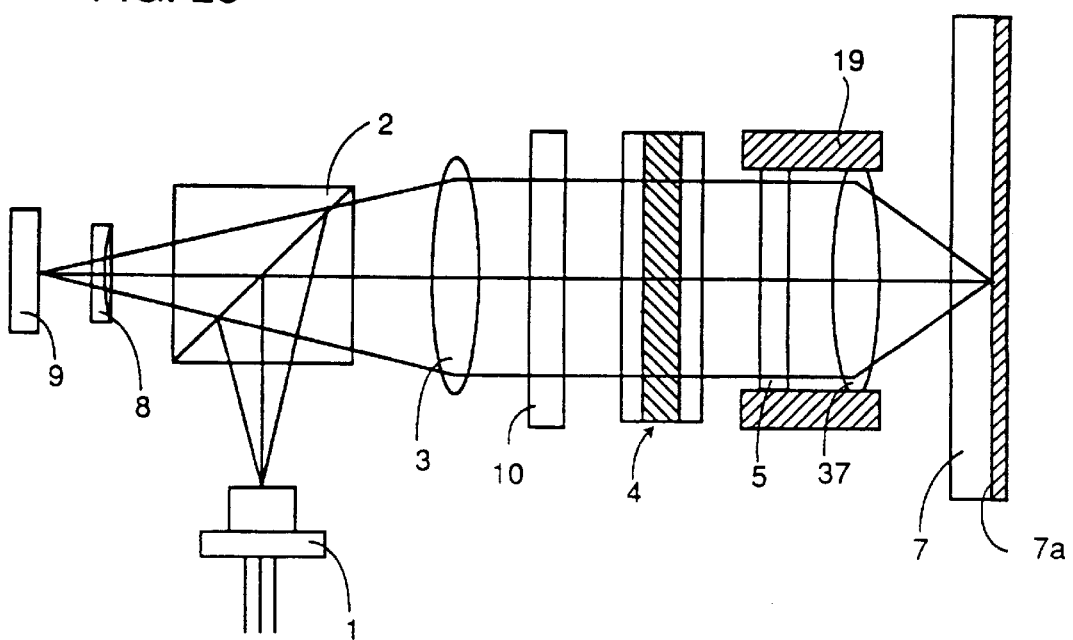
FIG. 23 is a schematic diagram showing an optical system of an optical pickup device in an optical disc reproducing apparatus according to a seventh embodiment of the present invention.

Referring to FIG. 23, the optical disc reproducing apparatus according to the seventh embodiment includes, unlike that of the first embodiment, an objective lens 37 designed to be adapted to a substrate of 0.8 mm in thickness, and a spherical aberration correcting plate 10 of an aspherical shape inserted between collimator lens 3 and polarization plane rotating unit 4. This optical disc reproducing apparatus can reproduce information recorded on the digital video disc according to the SD standard, the compact disc, and the digital video disc according to the MMCD standard. Spherical aberration correcting plate 10 corrects spherical aberration of objective lens 37 according to the type of optical disc to be read. Spherical aberration correcting plate 10 is formed of a hologram element, a diffraction grating and the like, for example.

Figure 24:
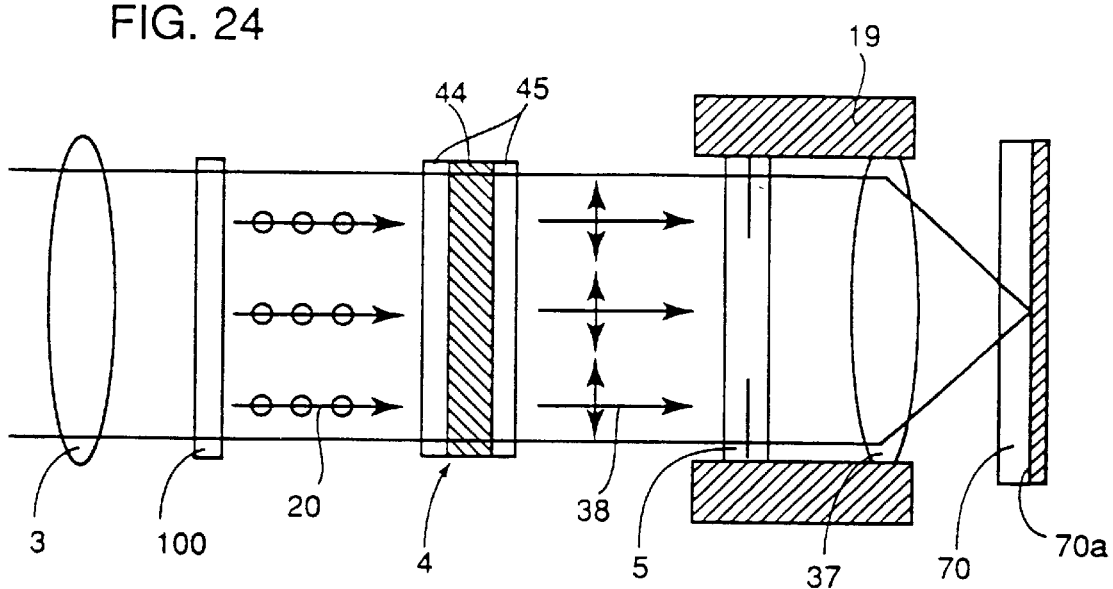
FIG. 24 is a diagram for describing operation when a digital video disc is read using the optical pickup device of FIG. 23.

In reading of the digital video disc according to the SD standard, a spherical aberration correcting plate 100 for a thin substrate is inserted, and no voltage is applied to transparent electrode plates 45 of polarization plane rotating unit 4, as shown in FIG. 24. Since polarization plane rotating unit 4 rotates the plane of polarization of laser beam 20 by 90° similarly in the first embodiment, the entire laser beam 38 passing through polarization plane rotating unit 4 is transmitted through polarizing filter 5.

Since objective lens 37 in the seventh embodiment is designed to be adapted to a substrate of 0.8 mm in thickness as described above, spherical aberration would be produced without spherical aberration correcting plate 100. However, since spherical aberration correcting plate 100 is inserted in the seventh embodiment, objective lens 37 converges laser beam 38 on recording surface 70a of the digital video disc according to the SD standard without spherical aberration being produced.

Figure 25:
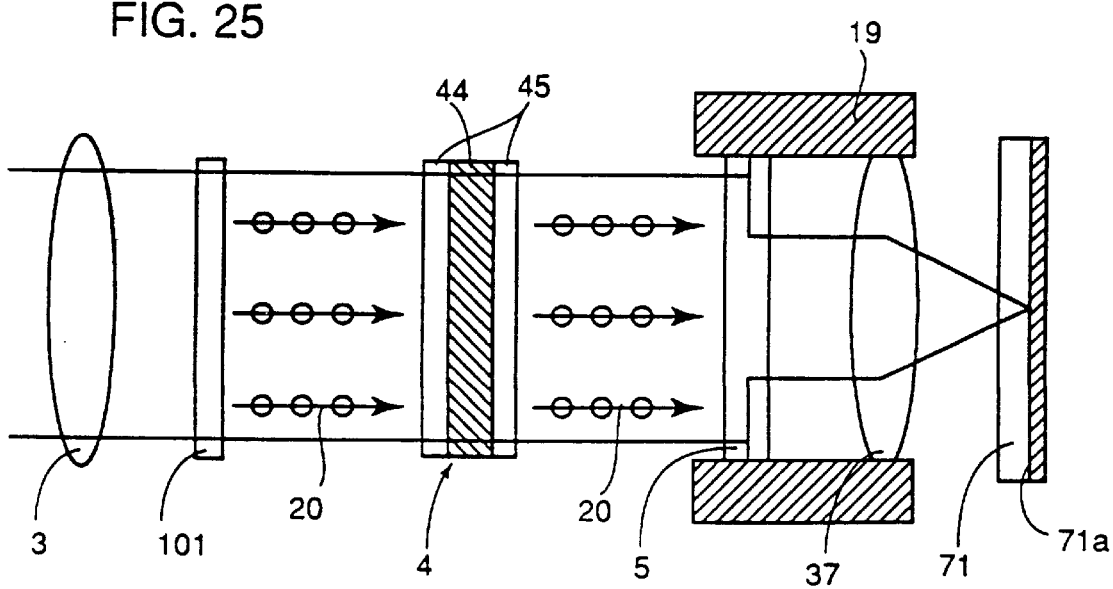
FIG. 25 is a diagram for describing operation when a compact disc is read using the optical pickup device of FIG. 23.

On the other hand, in reading of the compact disc or the digital video disc according to the MMCD standard, a spherical aberration correcting plate 101 for a substrate of a standard thickness is inserted, and a predetermined voltage is applied to transparent electrode plates 45 of polarization plane rotating unit 4, as shown in FIG. 25. Therefore, similar to the case of the first embodiment, polarization plane rotating unit 4 transmits laser beam 20 without rotating the plane of polarization. Polarizing filter 5 shades the peripheral portion of laser beam 20, and transmits only the central portion of laser beam 20.

Since spherical aberration correcting plate 101 for a substrate of a standard thickness is inserted in this embodiment, objective lens 37 converges laser beam 20 on recording surface 71a of the compact disc or the digital video disc according to the MMCD standard without spherical aberration being produced.

In the seventh embodiment, polarization plane rotating unit 4 is provided between spherical aberration correcting plate 10 and polarizing filter 5, and spherical aberration correcting plate 10 is provided between collimator lens 3 and polarization plane rotating unit 4. However, polarization plane rotating unit 4 and spherical aberration correcting plate 10 may be provided between semiconductor laser 1 and half prism 2 or between collimator lens 3 and polarizing filter 5. Spherical aberration correcting plate 10 may be provided between half prism 2 and collimator lens 3 or between collimator lens 3 and polarizing filter 5. More specifically, polarization plane rotating unit 4 and spherical aberration correcting plate 10 may be positioned anywhere as far as they are closer to semiconductor laser 1 than polarizing filter 5. Polarization plane rotating unit 4 and spherical aberration correcting plate 10 may be positioned oppositely to the case of FIG. 23.

Although objective lens 37 is designed to be adapted to substrate 7 of 0.8 mm in thickness in the seventh embodiment, objective lens 37 may be designed to be adapted to a substrate of other than 0.8 mm in thickness, for example, 0.6 to 1.2 mm in thickness. When the objective lens is designed to be approximately adapted to a substrate of 0.6 mm in thickness, the digital video disc according to the SD standard having substrate 70 of 0.6 mm in thickness can be read stably. When the objective lens is designed to be approximately adapted to a substrate of 1.2 mm in thickness, the compact disc or the digital video disc according to the MMCD standard having substrate 71 of 1.2 mm in thickness can be read stably.

When the objective lens is designed to be adapted to substrate 70 of 0.6 mm in thickness, spherical aberration correcting plate 100 for a thin substrate in FIG. 24 does not have to be inserted. When the objective lens is designed to be adapted to substrate 71 of 1.2 mm in thickness, spherical aberration correcting plate 101 for a substrate of a standard thickness in FIG. 25 does not have to be inserted.

Eighth Embodiment

Figure 26:
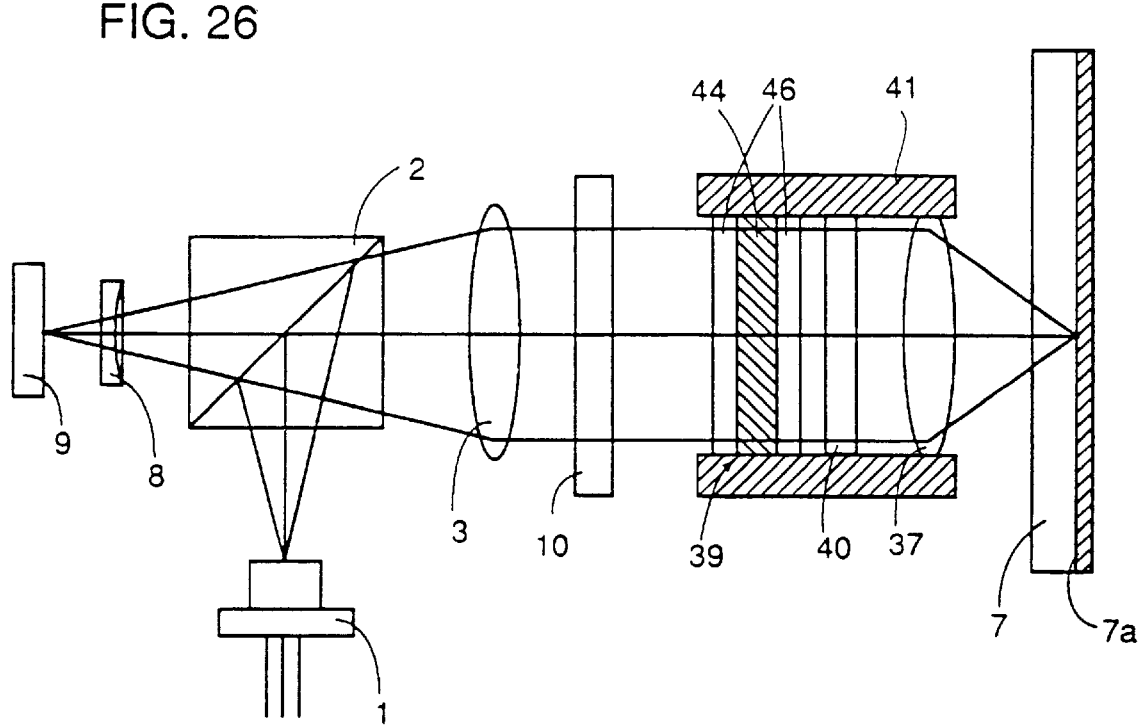
FIG. 26 is a schematic diagram showing an optical system of an optical pickup device in an optical disc reproducing apparatus according to an eighth embodiment of the present invention.

In the eighth embodiment, not only objective lens 37 and a polarizing filter 40 but also a polarization plane rotating unit 39 is held together by a lens holder 41, as shown in FIG. 26. Therefore, not only polarizing filter 40 but also polarization plane rotating unit 39 is fixed to objective lens 37, and displaced in the tracking direction and the focus direction together with objective lens 37.

Objective lens 37 is designed to be adapted to a substrate of 0.8 mm in thickness as in the seventh embodiment. Further, spherical aberration correcting plate 10 is inserted between collimator lens 3 and polarization plane rotating unit 39 as in the seventh embodiment.

The optical disc reproducing apparatus according to the eighth embodiment can read the digital video disc according to the SD standard, the compact disc, and the digital video disc according to the MMCD standard.

Figure 27:
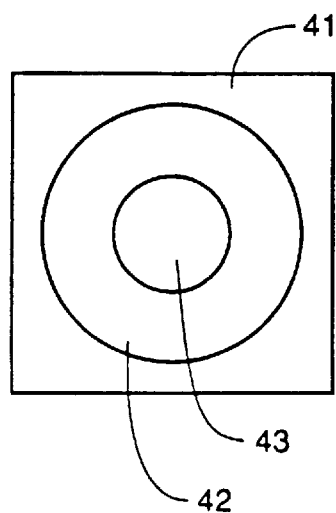
FIG. 27 is a front view showing the structure of a TN type liquid crystal in FIG. 26.

Unlike polarization plane rotating unit 4, polarization plane rotating unit 39 is divided into three areas 41 to 43 as shown in FIG. 27. More specifically, divided transparent conductive films are formed on glass substrates of transparent electrode plates 46 corresponding to these three areas 41 to 43. Therefore, the laser beam passes through the area to which a voltage is applied without its plane of polarization being rotated, and the laser beam passes through the area to which no voltage is applied with its plane of polarization being rotated by 90°.

When objective lens 37 has a numerical aperture of 0.6 (tolerance ±0.05) and an effective luminous flux diameter of 4 mm, area 42 of polarization plane rotating unit 39 is formed into a circle of 3.47 (tolerance ±0.13) mm in diameter so that the effective numerical aperture of objective lens 37 is 0.52 (tolerance ±0.02), and innermost area 43 of polarization plane rotating unit 39 is formed into a circle of 2.3 (tolerance ±0.2) mm in diameter so that the effective numerical aperture of objective lens 37 is 0.35 (tolerance ±0.05). Note that when the effective luminous flux diameter is not 4 mm, the diameter of middle area 42 is set in proportion to the effective luminous flux diameter so that the effective numerical aperture is 0.52, and the diameter of innermost area 43 is set in proportion to the effective luminous flux diameter so that the effective numerical aperture is 0.35.

Figure 28:
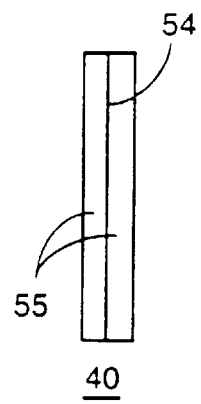
FIG. 28 is a cross-sectional view showing the structure of a polarizing filter in FIG. 26.

As shown in FIG. 28, polarizing filter 40 includes a polarizing film 54 transmitting only the laser beam having the plane of polarization parallel to the paper surface, and two glass plates 55 sandwiching polarizing film 54. Unlike patterned polarizing film 51 in FIG. 3, polarizing film 54 is sandwiched between the entire surfaces of two glass plates 55.

Figure 29:
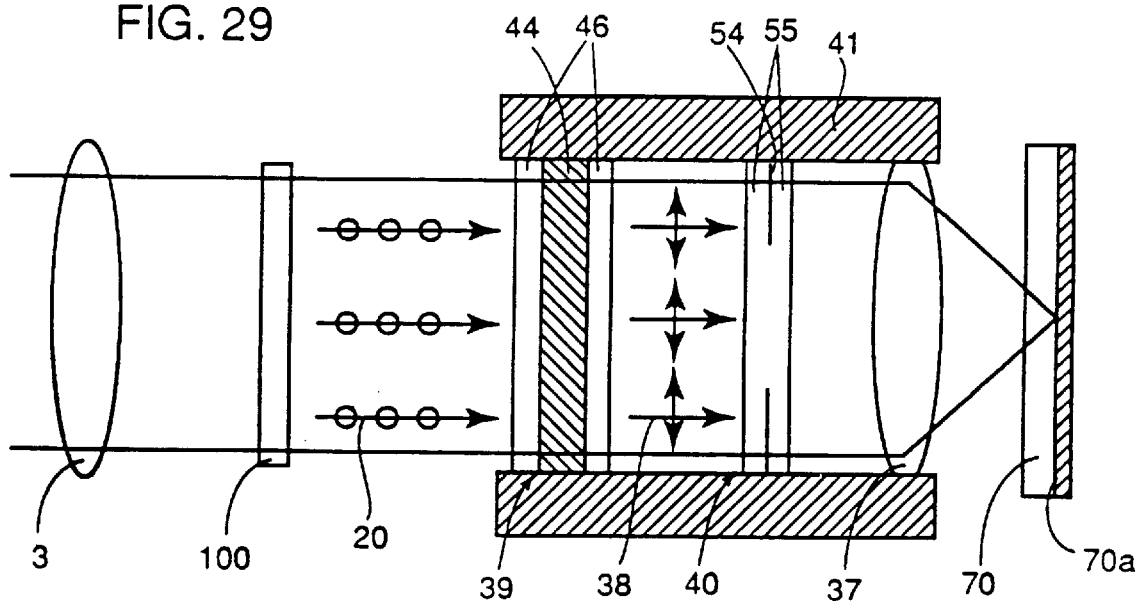
FIG. 29 is a diagram for describing operation when an optical disc according to the SD standard is read using the optical pickup device of FIG. 26.

First, in reading of the digital video disc according to the SD standard, spherical aberration correcting plate 100 for a thin substrate is inserted, and no voltage is applied to any of areas 41 to 43 of polarization plane rotating unit 39, as shown in FIG. 29. Therefore, the entire laser beam 20 incident on polarization plane rotating unit 39 is transmitted, and its plane of polarization is rotated by 90°. The entire laser beam 38 having the plane of polarization parallel to the paper surface is transmitted through polarizing filter 40. As a result, objective lens 37 converges the entire laser beam 38 on recording surface 70*a* of the digital video disc according to the SD standard.

Figure 30:
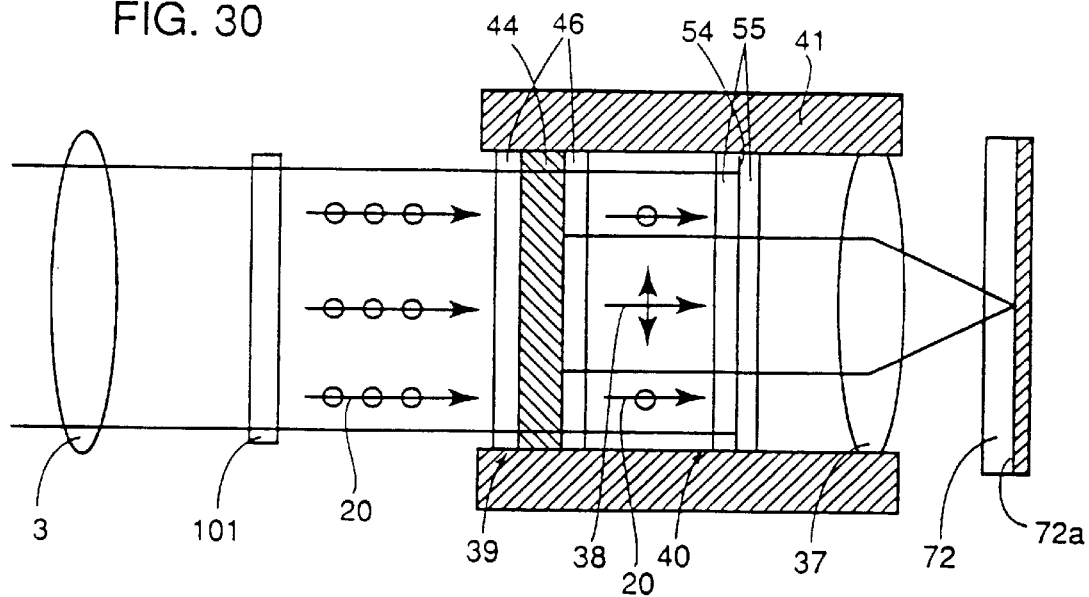
FIG. 30 is a diagram for describing operation when the compact disc is read using the optical pickup device of FIG. 26.

Second, in reading of the compact disc, spherical aberration correcting plate 101 for a substrate of a standard thickness is inserted, and a predetermined voltage is applied to areas 41 and 42 of polarization plane rotating unit 39, as shown in FIG. 30. Therefore, the laser beam passes through areas 41 and 42 without its plane of polarization rotated. Although laser beam 20 passes through innermost area 43, its plane of polarization is rotated by 90°. Polarizing filter 40 shades laser beam 20 passing through areas 41 and 42 and having the plane of polarization perpendicular to the paper surface, and transmits laser beam 38 passing through innermost area 43 and having the plane of polarization parallel to the paper surface. As a result, objective lens 37 converges only the central portion of the laser beam on a recording surface 72*a* of the compact disc.

Figure 31:
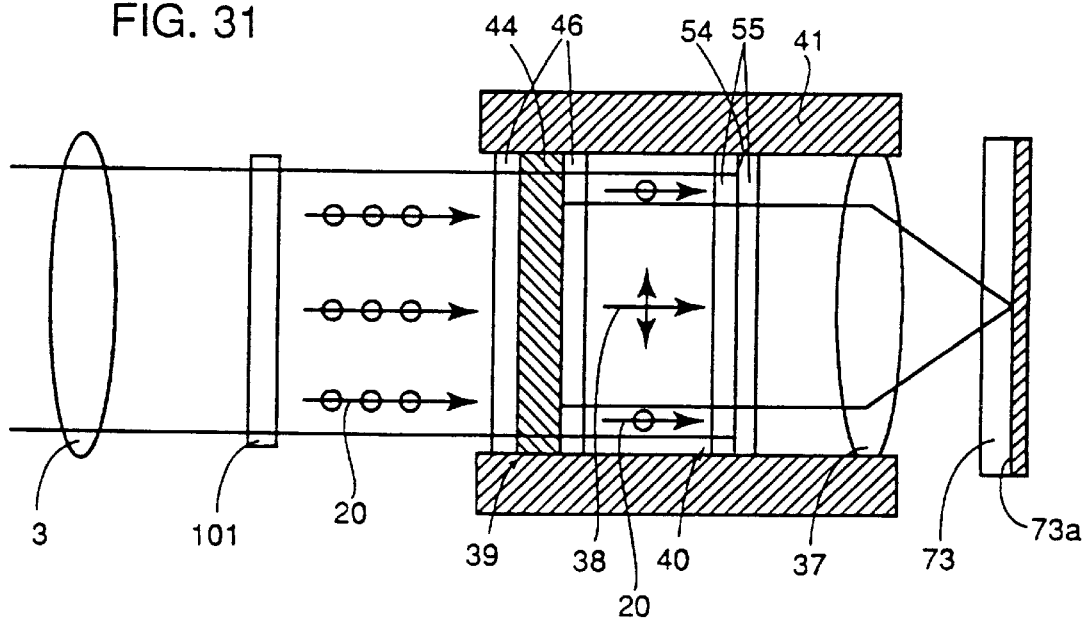
FIG. 31 is a diagram for describing operation when an optical disc according to the MMCD standard is read using the optical pickup device of FIG. 26.

Third, in reading of the digital video disc according to the MMCD standard, spherical aberration correcting plate 101 for a substrate of a standard thickness is inserted, and a predetermined voltage is applied only to outermost area 41 of polarization plane rotating unit 39, as shown in FIG. 31. Therefore, laser beam 20 passes through outermost area 41 without its plane of polarization rotated. Although laser beam 20 passes through middle and innermost areas 42 and 43, the plane of polarization is rotated by 90°. Polarizing filter 40 shades laser beam 20 passing through outermost area 41 and having the plane of polarization perpendicular to the paper surface, and transmits laser beam 38 passing through middle and innermost areas 42 and 43 and having the plane of polarization parallel to the paper surface. As a result, objective lens 37 converges only the central portion (wider than that of FIG. 30) of the laser beam on a recording surface 73*a* of the digital video disc according to the MMCD standard.

As described above, according to the eighth embodiment, patterned polarization plane rotating unit 39 and non-patterned polarizing filter 40 change the effective numerical aperture of objective lens 37 according to the thickness of substrate 7 of the optical disc to be read. Therefore, the optical disc reproducing apparatus of this embodiment can read the digital video disc according to the SD standard, the compact disc, and the digital video disc according to the MMCD standard. As shown in the eighth embodiment, the polarization plane rotating unit may be patterned instead of the polarizing filter. In this case, polarizing filter 40 does not have to be patterned.

Ninth Embodiment

Figure 32:
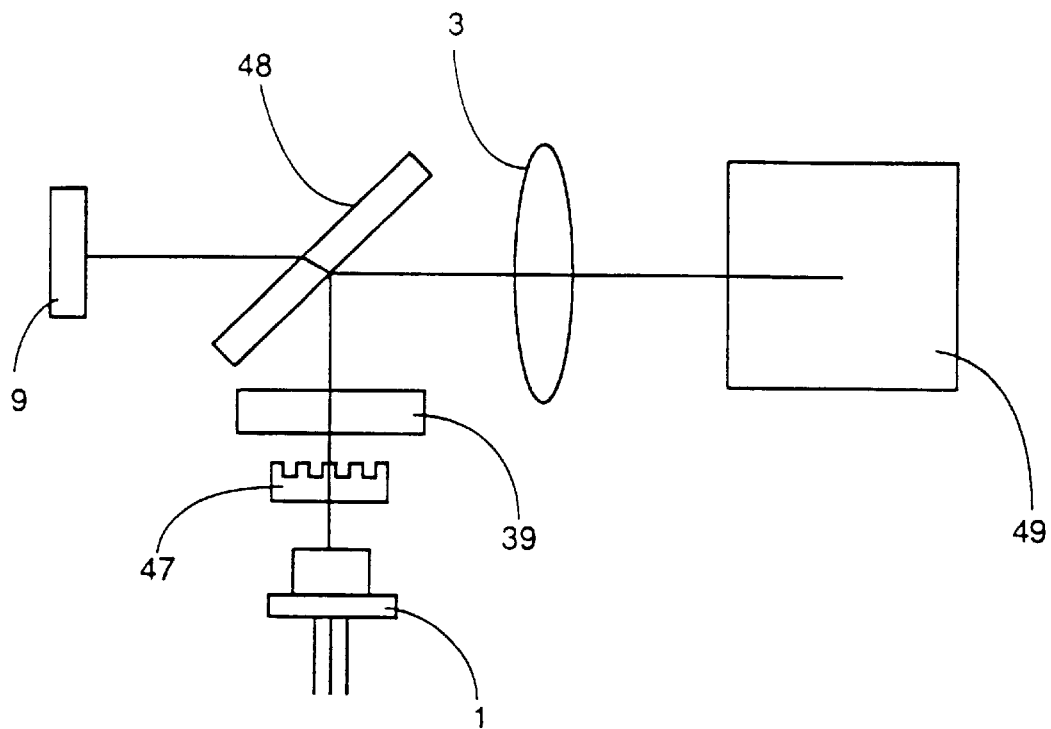
FIG. 32 is a schematic diagram showing an optical system of an optical pickup device in an optical disc reproducing apparatus according to a ninth embodiment of the present invention.
Figure 33:
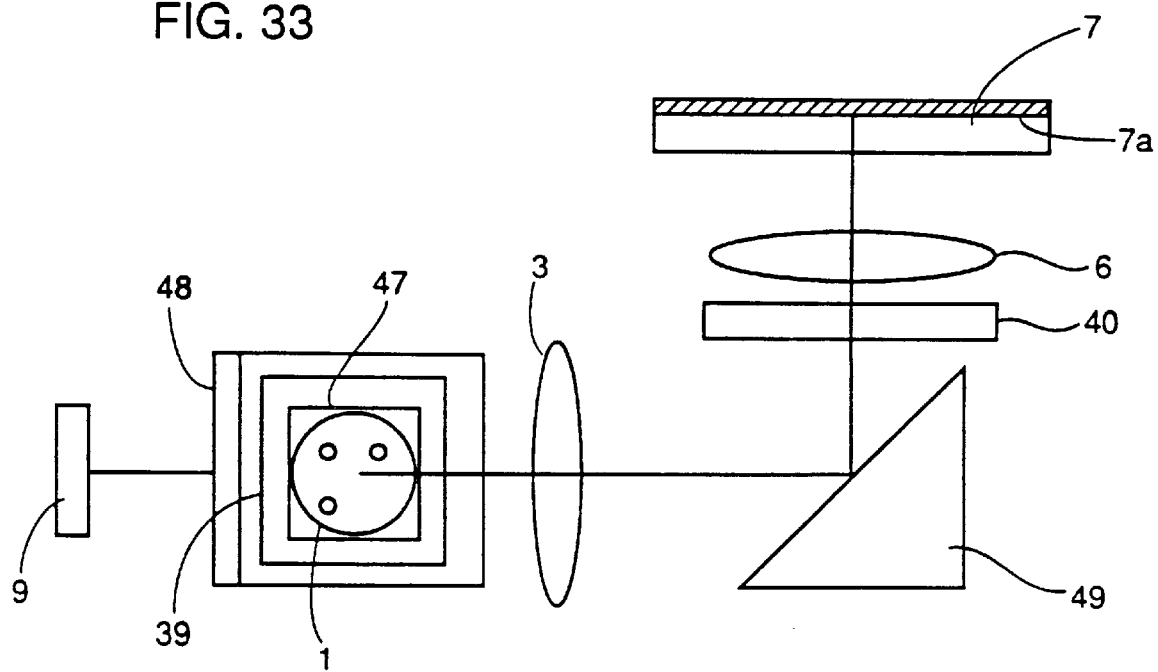
FIG. 33 is a side view of the optical system of FIG. 32.

The optical disc reproducing apparatus according to the ninth embodiment includes a half mirror plate 48 instead of half prism 2, as shown in FIG. 32. Patterned polarization plane rotating unit 39 is inserted between half mirror plate 48 and a diffraction grating 47. In FIG. 32, diffraction grating 47 and a reflecting mirror 49 are shown, which are not shown in the above embodiments. Diffraction grating 47 forms two beam spots for tracking control in addition to a beam spot for reproduction. Since polarization plane rotating unit 39 is patterned in the ninth embodiment, polarizing filter 40 shown in FIG. 33 does not have to be patterned. As shown in FIG. 33, polarization plane rotating unit 39 may be provided not just in front of polarizing filter 40 but between half mirror plate 48 and diffraction grating 47.

Tenth Embodiment

Figure 34:
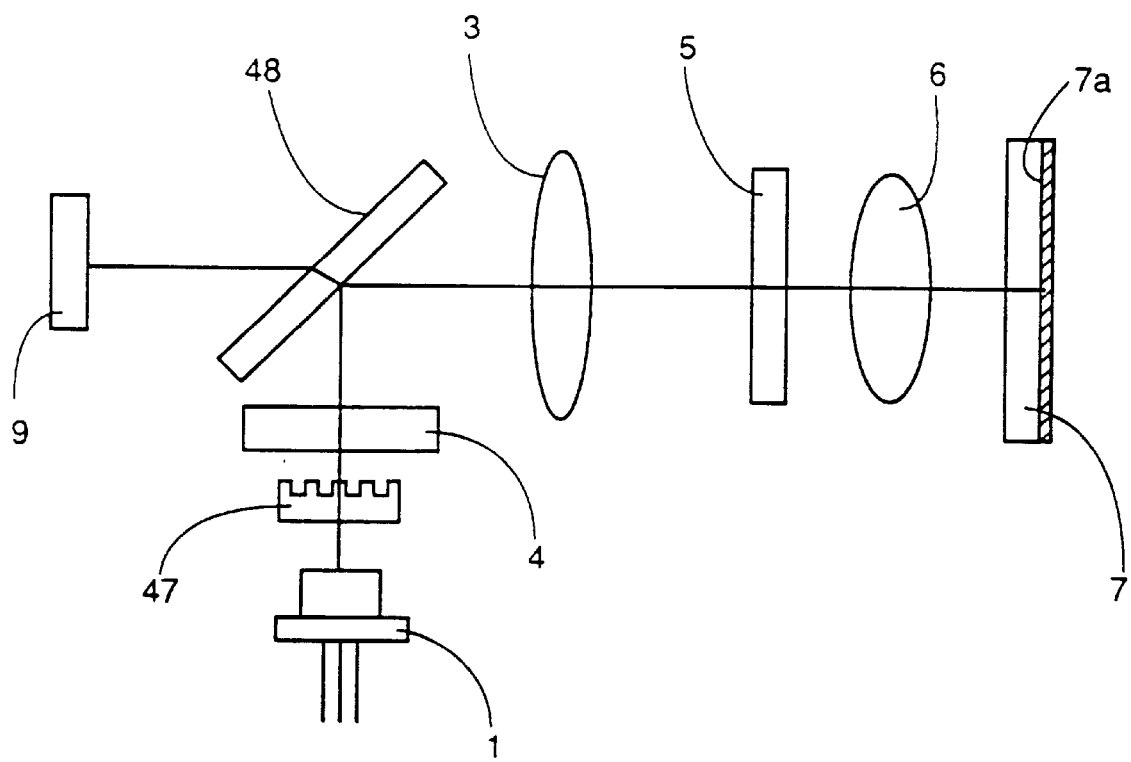
FIG. 34 is a schematic diagram showing an optical system of an optical pickup device in an optical disc reproducing apparatus according to a tenth embodiment of the present invention.

The optical disc reproducing apparatus according to the tenth embodiment includes half mirror plate 48 instead of half prism 2, as shown in FIG. 34. Non-patterned polarization plane rotating unit 4 is inserted between half mirror plate 48 and diffraction grating 47. Since polarization plane rotating unit 4 is not patterned unlike in the ninth embodiment, polarizing filter 5 is patterned. In FIG. 34, the reflecting mirror is not shown.

Eleventh Embodiment

Figure 35:
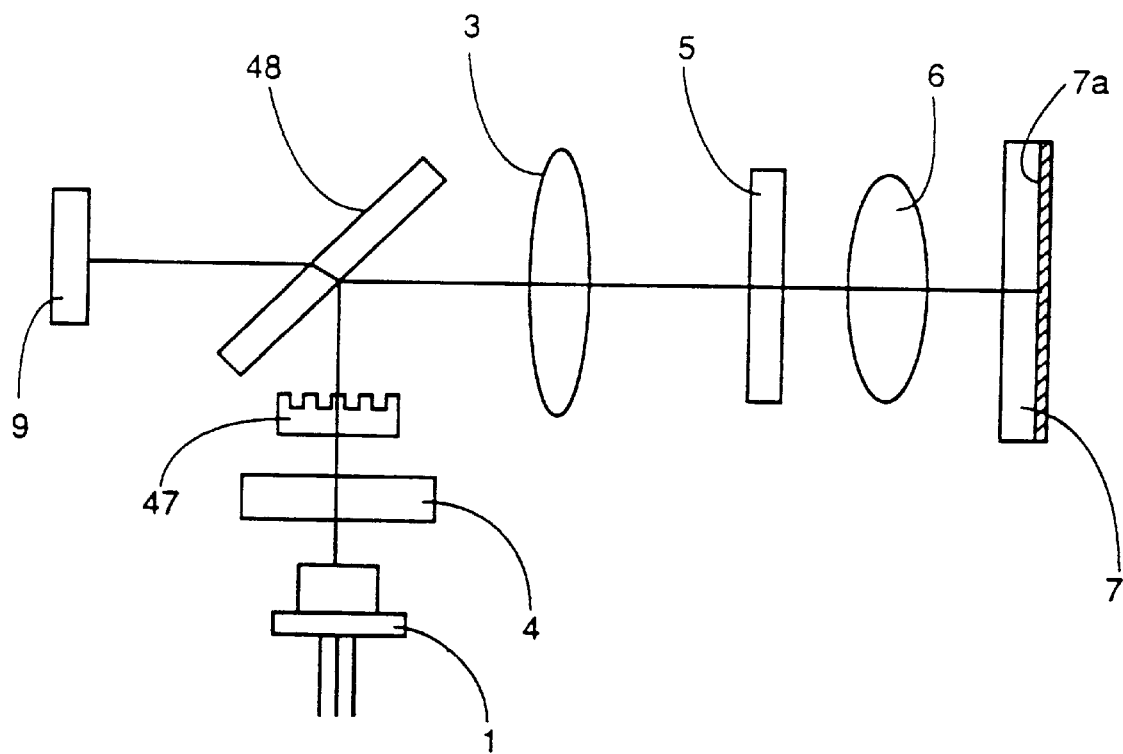
FIG. 35 is a schematic diagram showing an optical system of an optical pickup device in an optical disc reproducing apparatus according to an eleventh embodiment of the present invention.

In the optical disc reproducing apparatus according to the eleventh embodiment, polarization plane rotating unit 4 and diffraction grating 47 are positioned oppositely to those of FIG. 34, as shown in FIG. 35. As in this embodiment, polarization plane rotating unit 4 may be inserted between diffraction grating 47 and semiconductor laser 1.

Twelfth Embodiment

Figure 36:
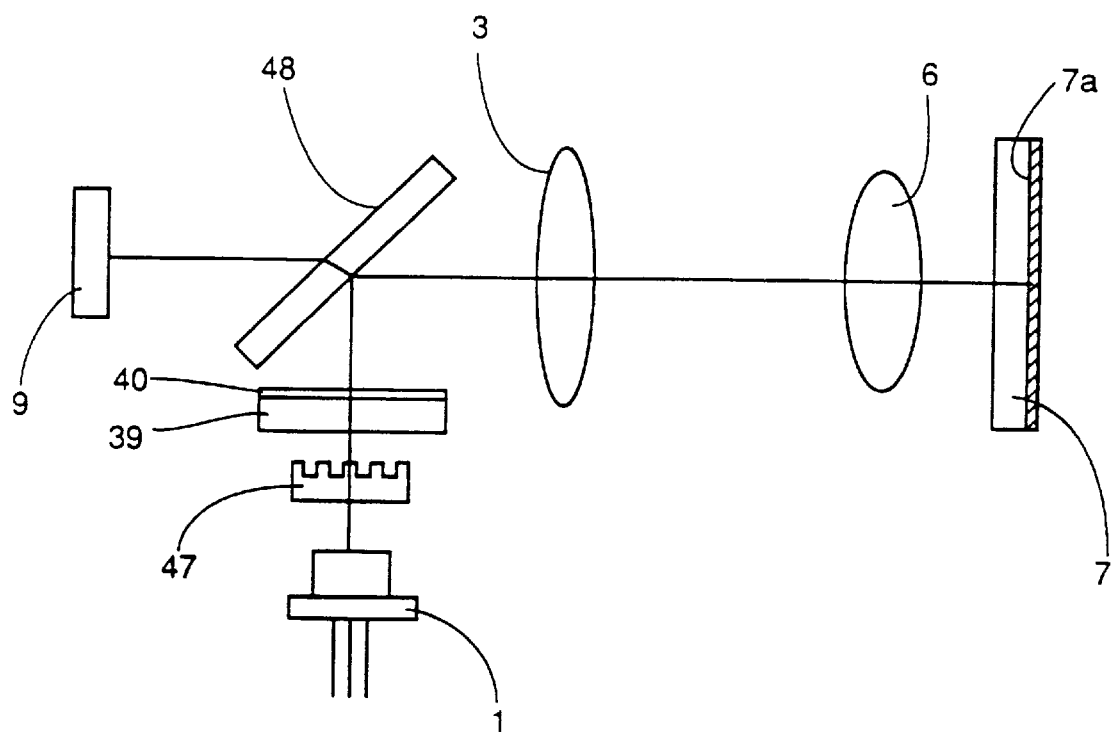
FIG. 36 is a schematic diagram showing an optical system of an optical pickup device in an optical disc reproducing apparatus according to a twelfth embodiment of the present invention.
Figure 37:
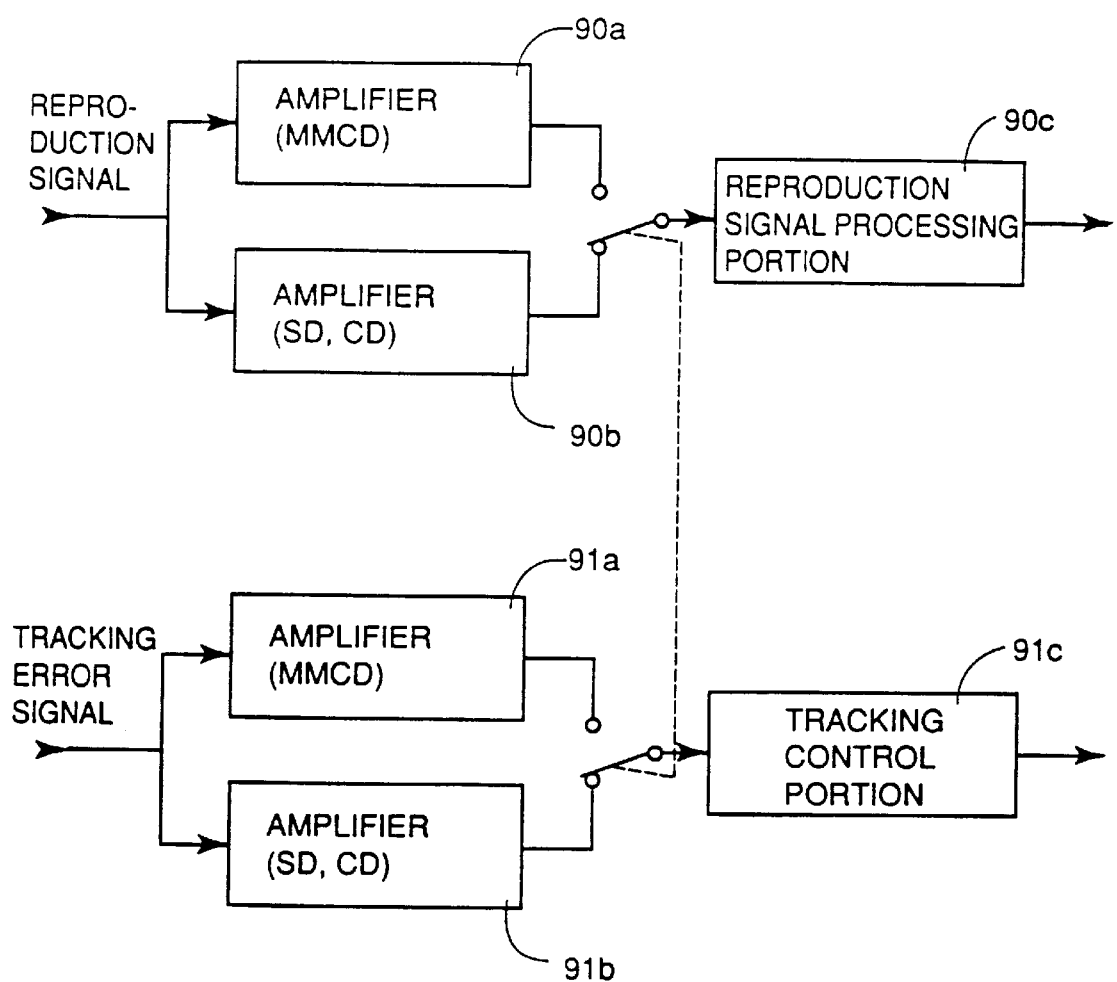
FIG. 37 is a block diagram showing a signal processing system in an optical disc reproducing apparatus according to a thirteenth embodiment of the present invention.

As shown in FIG. 36, in the optical disc reproducing apparatus according to the twelfth embodiment, non-patterned polarizing filter 40 is laminated not just in front of objective lens 6 but on the rear surface of patterned polarization plane rotating unit 39, unlike in FIG. 32. Such integration of polarization plane rotating unit 39 and polarizing filter 40 simplifies structure and assembly required for changing the effective numerical aperture of objective lens 6.

In the twelfth embodiment, polarization plane rotating unit 39 is patterned, and polarizing filter 40 is not patterned. On the contrary, the polarizing filter may be patterned, and the polarization plane rotating unit may not be patterned.

Thirteenth Embodiment

In the optical disc reproducing apparatus capable of reading the digital video disc according to the MMCD standard among those of the above embodiments, reproduction signal processing circuit 17 of FIG. 1 preferably includes an amplifier 90a for MMCD and an amplifier 90b for SD or CD. Further, tracking control circuit 18 in FIG. 1 preferably includes an amplifier 91a for MMCD and an amplifier 91b for SD or CD.

In the thirteenth embodiment, the reproduction signal generated by the photodetector is amplified by amplifier 90a or 90b, and the amplified reproduction signal is applied to a reproduction signal processing portion 90c. The tracking error signal simultaneously generated by the photodetector is amplified by amplifier 91a or 91b, and the amplified tracking error signal is applied to a tracking control portion 91c.

Amplifier 90a for MMCD has a larger gain than amplifier 90b for SD or CD. Amplifier 90a has a large gain particularly in a high frequency component of the reproduction signal. Amplifier 90a for MMCD is activated in reading of the digital video disc according to the MMCD standard, and amplifier 90b for SD or CD is activated in reading of the digital video disc according to the SD standard or the compact disc.

Amplifier 91a for MMCD has a larger gain than amplifier 91b for SD or CD. Amplifier 91a for MMCD is activated in reading of the digital video disc according to the MMCD standard, and amplifier 91b for SD or CD is activated in reading of the digital video disc according to the SD standard or the compact disc.

Therefore, in reading of the digital video disc according to the MMCD standard, the reproduction signal is amplified by amplifier 90a for MMCD more significantly than in reading of the digital video disc according to the SD standard or the compact disc, to be applied to reproduction signal processing portion 90c. On the other hand, the tracking error signal is amplified by amplifier 91a for MMCD more significantly in reading of the digital video disc according to the MMCD standard than in reading of the digital video disc according to the SD standard or the compact disc, to be applied to tracking control portion 91c. As a result, jitter and noise of the reproduction signal and the tracking error signal obtained from the digital video disc according to the MMCD standard can be reduced. Similar to the reproduction signal and the tracking error signal, a focus error signal is also preferably amplified more significantly in reading of the digital video disc according to the MMCD standard than in reading of the digital video disc according to the SD standard or the compact disc.

Fourteenth Embodiment

In the above embodiments, a laser beam having a wavelength of 585 to 685 nm or 600 to 700 nm is used. However, there is no limitation on the wavelength of the laser beam. For example, a laser beam having a short wavelength may be used. A laser beam having a wavelength in the range of 350 to 700 nm can be used. The effective numerical aperture of the objective lens is not limited to ones shown in the above embodiments. The effective numerical aperture can be set in the range of 0.20 to 0.65. Although the thickness of the substrate of the optical disc to be read is 1.2 mm and 0.6 mm in the above embodiments, the thickness is not limited thereto.

The following table 2 shows rated values and reproduction conditions of each of optical discs when the digital video disc according to the SD standard, the compact disc, and a high density digital video disc are read using a blue laser (wavelength: 350–450 nm, typical wavelength: 415–445 nm).

TABLE 2

|  | DVD (SD) | CD (Standard) | High density DVD |
|---|---|---|---|
| Rated value |  |  |  |
| Substrate thickness | 0.6 mm (0.55~0.65 mm) | 1.2 mm (1.1~1.3 mm) | 0.6 mm (0.55~0.65 mm) |
| Pit length | 0.40 μm (0.38~0.42 μm) | 0.83 μm (0.80~0.90 μm) | 0.25 μm (0.20~0.30 μm) |
| Pit depth | 105 nm (95~115 nm) | 110 nm (90~130 nm) | 72 nm (62~82 nm) |
| Track pitch | 0.74 μm (0.69~0.79 μm) | 1.6 μm (1.5~1.7 μm) | 0.50 μm (0.42~0.58 μm) |
| Reproduction condition |  |  |  |
| Spot diameter | 0.92 μm (0.72~1.12 μm) | 1.51 μm (1.31~1.71 μm) | 0.63 μm (0.43~0.83 μm) |
| Effective numerical aperture | 0.41 (0.36~0.46) | 0.25 (0.20~0.30) | 0.60 (0.55~0.65) |
| Wavelength (Blue laser) |  | 430 nm (350~450 nm) |  |

In the high density digital video disc, the thickness of the substrate is 0.6 (tolerance ±0.05) mm, the pit length is 0.25 (tolerance ±0.05) μm, the pit depth is 72 (tolerance ±10) nm, and the track pitch is 0.50 (tolerance ±0.08) μm. Therefore, the high density digital video disc has a recording density higher than the digital video disc according to the SD standard.

As is clear from the table 2, in order to read the above described three kinds of optical discs with a blue laser, the effective numerical aperture of the objective lens is set to 0.20–0.30 in reading of the compact disc, 0.36–0.46 in reading of the digital video disc according to the SD standard, and 0.55–0.65 in reading of the high density digital video disc. The objective lens is preferably designed to be adapted to the high density digital video disc, with the numerical aperture of 0.55–0.65. In this case, the effective numerical aperture of the objective lens can be changed to 0.36–0.46 or 0.20–0.30. Alternatively, the objective lens is preferably designed to be adapted to the digital video disc according to the SD standard, having the numerical aperture of 0.36–0.60. In this case, the effective numerical aperture of the objective lens can be changed to 0.20–0.30. The effective numerical aperture of the objective lens can be changed with the method indicated in the above embodiments. Therefore, although the digital video disc according to the SD standard, the compact disc, and the high density digital video disc can be read with the blue laser, the blue laser is suitable for reading of the digital video disc according to the SD standard and the high density digital video disc.

The following table 3 shows rated values and reproduction conditions of respective optical discs when the above described three kinds of optical discs are read with a green laser (wavelength: 450–550 nm, typical wavelength: 517–547 nm).

TABLE 3

| | DVD (SD) | CD (Standard) | High density DVD |
|---|---|---|---|
| Rated value | | | |
| Substrate thickness | 0.6 mm (0.55~0.65 mm) | 1.2 mm (1.1~1.3 mm) | 0.6 mm (0.55~0.65 mm) |
| Pit length | 0.40 µm (0.38~0.42 µm) | 0.83 µm (0.80~0.90 µm) | 0.25 µm (0.20~0.30 µm) |
| Pit depth | 105 nm (95~115 nm) | 110 nm (90~130 nm) | 88 nm (78~98 nm) |
| Track pitch | 0.74 µm (0.69~0.79 µm) | 1.6 µm (1.5~1.7 µm) | 0.50 µm (0.42~0.58 µm) |
| Reproduction condition | | | |
| Spot diameter | 0.94 µm (0.74~1.14 µm) | 1.55 µm (1.35~1.75 µm) | 0.78 µm (0.58~0.98 µm) |
| Effective numerical aperture | 0.50 (0.45~0.55) | 0.30 (0.25~0.35) | 0.60 (0.55~0.65) |
| Wavelength (Green laser) | | 532 nm (450~550 nm) | |

As is clear from the table 3, in order to read the three kinds of optical discs using the green laser, the effective numerical aperture of the objective lens is set to 0.25–0.35 in reading of the compact disc, 0.45–0.55 in reading of the digital video disc according to the SD standard, and 0.55–0.65 in reading of the high density digital video disc. The objective lens is preferably designed to be adapted to the high density digital video disc, having the numerical aperture of 0.55–0.65. In this case, the effective numerical aperture of the objective lens can be changed to 0.45–0.55 or 0.25–0.35. Alternatively, the objective lens is preferably designed to be adapted to the digital video disc according to the SD standard, having the numerical aperture of 0.45–0.60. In this case, the effective numerical aperture of the objective lens can be changed to 0.25–0.35. The effective numerical aperture of the objective lens can also be changed with the method indicated in the above embodiments. Although the green laser is suitable for reading of the digital video disc according to the SD standard and the compact disc, the green laser can also read the high density digital video disc.

Only two kinds of discs, the digital video disc according to the SD standard and the compact disc, may be read with the blue laser. In this case, the numerical aperture of the objective lens may be set to 0.36–0.60, and the effective numerical aperture of the transparent aperture may be switched selectively in the range of 0.25–0.35. On the other hand, when only two kinds of discs, that is, the digital video disc according to the SD standard and the compact disc, are read with the green laser, the numerical aperture of the objective lens may be set to 0.45–0.60, and the effective numerical aperture of the transparent aperture may be switched selectively in the range of 0.20–0.30.

Fifteenth Embodiment

Although only reproduction of information on the optical disc was described in the above embodiments, the present invention can be applied to recording of information on the optical disc. By using a semiconductor laser having a wavelength of 680 (tolerance ±15) nm, 650 (tolerance ±50) nm, 635 (tolerance ±50) nm, 500 (tolerance ±50) nm, or 400 (tolerance ±50) nm and a power of 30 mW, for example, information can be recorded on the digital video disc according to the SD standard, the compact disc, and the high density digital video disc. In this case, the effective numerical aperture of the objective lens is set so as to be adapted to the respective optical discs and the respective wavelengths.

Sixteenth Embodiment

Figure 38:
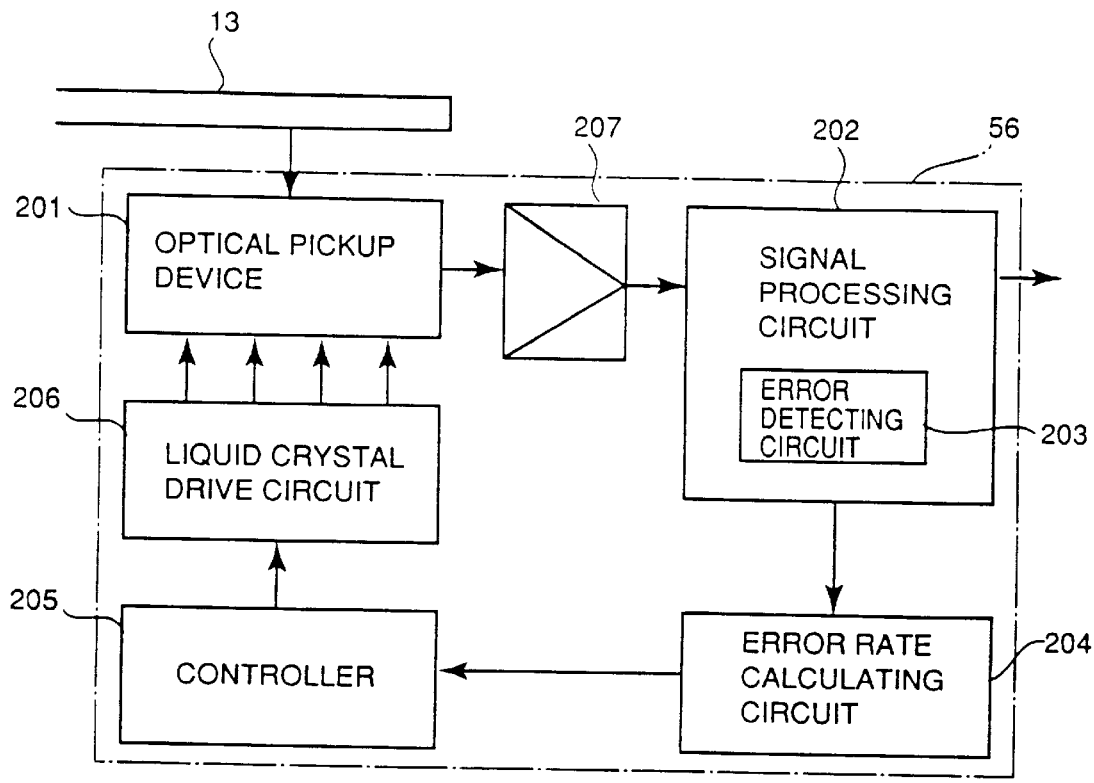
FIG. 38 is a block diagram showing the schematic structure of the optical disc reproducing apparatus according to the thirteenth embodiment of the present invention.
Figure 39:
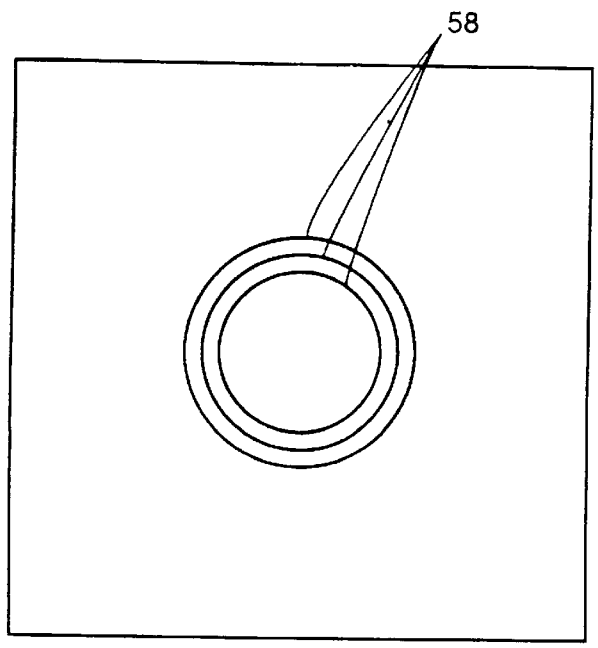
FIG. 39 is a front view showing the structure of a TN type liquid crystal used in an optical pickup device in FIG. 38.

In the above embodiments, the effective numerical aperture of the objective lens is changed according to the substrate thickness or the recording density of the optical disc. However, the effective numerical aperture of the objective lens may be changed in a multistage manner according to an error rate of the detected reproduction signal. As shown in FIG. 38, an optical disc reproducing apparatus 56 according to the sixteenth embodiment includes an optical pickup device 201, an amplifier 207 amplifying the reproduction signal from optical pickup device 201, a signal processing circuit 202 processing the amplified reproduction signal, an error rate calculating circuit 204 calculating an error rate produced in a predetermined period based on the output of an error detecting circuit 203 in signal processing circuit 202, a liquid crystal drive circuit 206 driving such a polarization plane rotating unit 57 as shown in FIG. 39 in optical pickup device 201, and a controller 205 controlling liquid crystal drive circuit 206 according to the error rate from error rate calculating circuit 204. Polarization plane rotating unit 57 has a plurality of transparent apertures 58 different in diameter as shown in FIG. 39. One of the plurality of transparent apertures 58 is selected. The plane of polarization of the laser beam passing through the selected transparent aperture is rotated. However, the plane of polarization of the laser beam passing through polarization plane rotating unit 57 excluding the selected transparent aperture 58 is not rotated.

According to the sixteenth embodiment, the diameter of transparent aperture 58 is changed according to the error rate. Therefore, the diameter of transparent aperture 58 can easily be set so that the error rate correlating with the amount of jitter is minimized.

Seventeenth Embodiment

Figure 40:
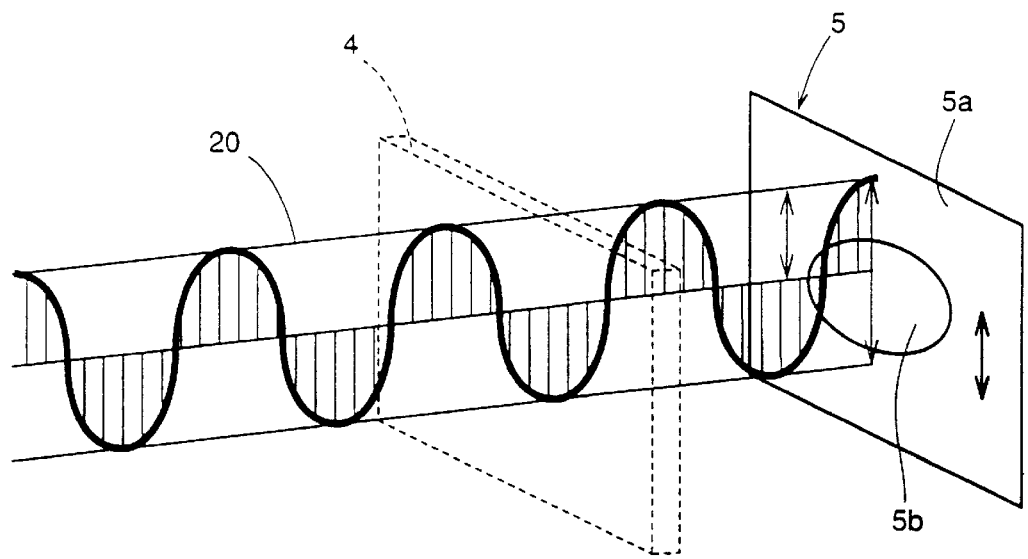
FIG. 40 is a perspective view showing an optical system of an optical pickup device in an optical disc recording/reproduction apparatus according to a seventeenth embodiment of the present invention.

In the above-described embodiments, the polarization plane rotating unit rotates the plane of polarization of a laser beam 90° in reproducing from a digital disc of the SD standard, and does not rotate the plane of polarization of the laser beam in reproducing from a compact disc. In contrast, it is preferable to suppress rotation of the plane of polarization of the laser beam in reproducing from a digital video disc of the SD standard, and rotating the plane of polarization of the laser beam 90° in reproducing from a compact disc. In this case, a polarizing filter 5 shown in FIG. 40 includes polarization characteristics in a direction identical to the polarization direction of the laser beam generated by the semiconductor laser. Polarizing filter 5 is formed of a peripheral portion 5a with polarization characteristics and a central portion 5b without polarization characteristics. Therefore, a laser beam that is polarized in any direction can pass through central portion 5b of polarizing filter 5. However, only a laser beam that is polarized in a vertical direction in the drawing can pass through peripheral portion 5a of polarizing filter 5.

Figure 41:
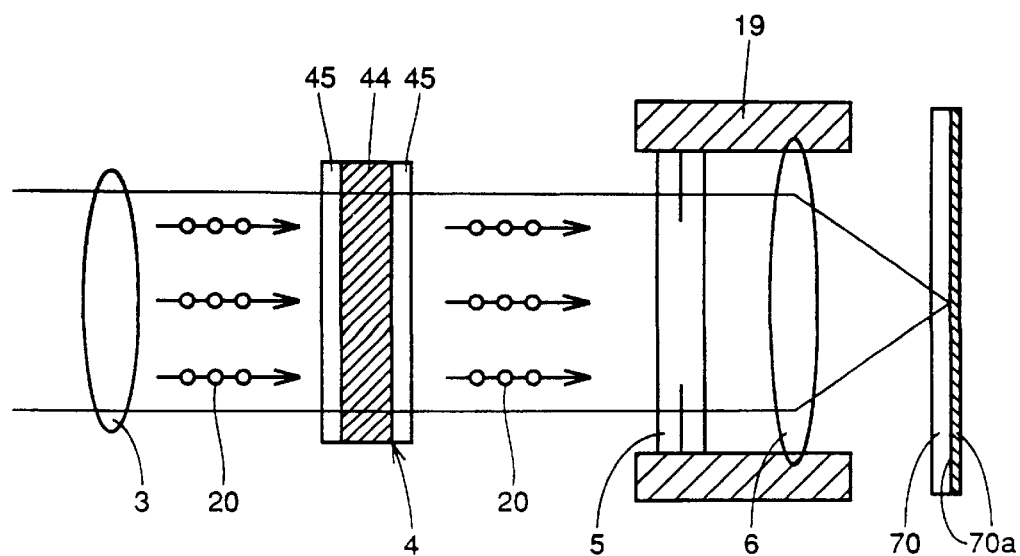
FIG. 41 is a schematic diagram for describing an operation of reproducing from a digital video disc using the optical pickup device of FIG. 40.

A reproduction operation of a digital video disc of the SD standard will be described with reference to FIG. 41. In reproducing information from a digital video disc of the SD standard, a voltage is applied to transparent electrode plate 45 of polarization plane rotating unit 4. Therefore, a laser beam 20 from the semiconductor laser that is polarized in a direction perpendicular to the paper surface is directly passed through without having its plane of polarization rotated. Since peripheral portion 5a of polarizing filter 5 has polarization characteristics of a direction identical to the polarization direction of incident laser beam 20, laser beam 20 is passed through without being intercepted by polarizing filter 5. Laser beam 20 passes through objective lens 6 and substrate 70 of the digital video disc to be focused on a recording surface 70a. The diameter of the beam spot formed on recording surface 70a is 0.9 (tolerance ±0.1) μm. Other operations are identical to those of FIG. 1, and will not otherwise be repeated.

Figure 42:
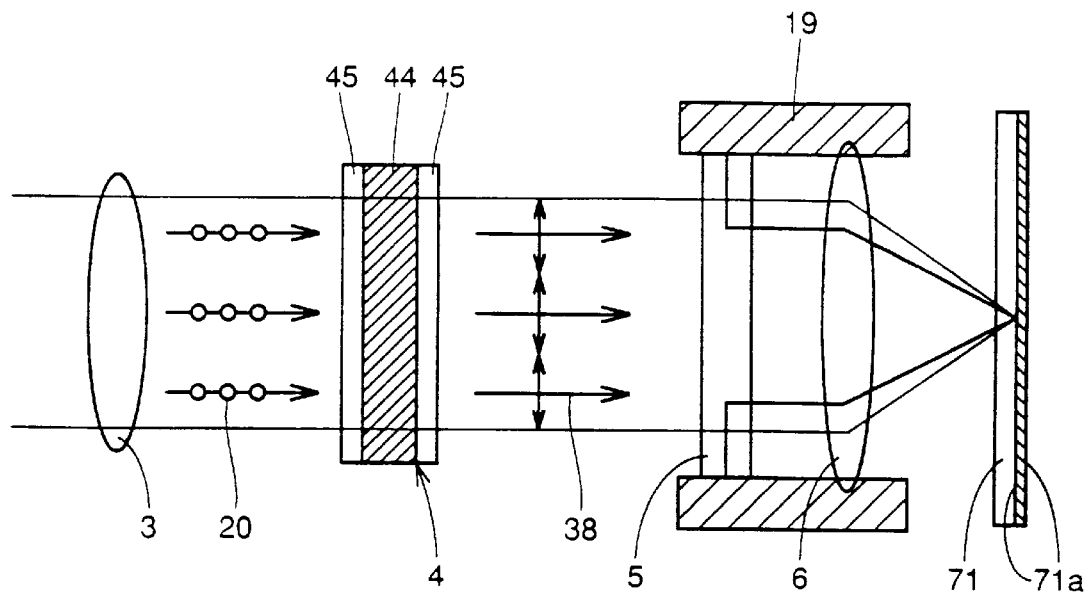
FIG. 42 is a schematic diagram for describing an operation of reproducing from a compact disc using the optical pickup device of FIG. 40.

A reproduction operation of a compact disc will be described with reference to FIG. 42. In reproducing information from a compact disc, a voltage is not applied to transparent electrode plate 45 of polarization plane rotating unit 4. Therefore, laser beam 20 generated from the semiconductor laser that is polarized in a direction perpendicular to the paper surface has its plane of polarization rotated 90° to be passed through polarization plane rotating unit 4. Therefore, a laser beam 38 that is rotated in a direction parallel to the paper surface enters polarizing filter 5 from polarization plane rotating unit 4. Since the peripheral portion of polarizing filter 5 has polarization characteristics perpendicular to the polarization direction of laser beam 38, the outer side portion of laser beam 38 is intercepted by polarizing filter 5. Therefore, only the central portion of laser beam 38 is incident upon objective lens 6. Laser beam 38 is focused on recording surface 71a of a compact disc by objective lens 6. The diameter of the beam spot formed on recording surface 71a is 1.5 (tolerance ±0.1) μm.

Other operations are similar to those of FIG. 2, and are not otherwise repeated herein.

Since voltage is applied to polarization plane rotating unit 4 in reproducing from a digital video disc, the plane of polarization of the laser beam is not rotated. In reproducing from a compact disc, voltage is not applied to polarization plane rotating unit 4, so that the plane of polarization of the laser beam is rotated 90°.

Although laser beam 20 prior to entering polarization plane rotating unit 4 is polarized in a direction perpendicular to the paper surface, the laser beam may be polarized in a direction parallel to the paper surface. In this case, peripheral portion 5a of polarizing filter 5 must have polarization characteristics in a direction parallel to the paper surface.

A hologram element including polarization characteristics or polarizing glass described above may be used instead of polarizing filter 5. Furthermore, a STN type liquid crystal, ferroelectric type liquid crystal, Pockels cell, or Faraday cell can be used instead of TN type liquid crystal 44.

Eighteenth Embodiment

Figure 43A:
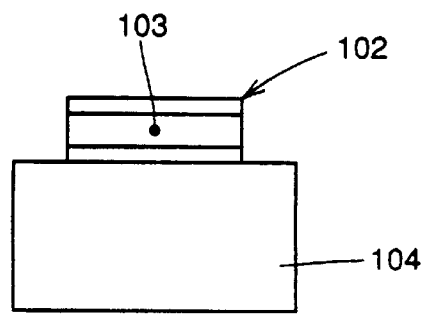
FIG. 43A is a top plan view showing a typical structure of the semiconductor laser in FIG. 2.
Figure 43B:
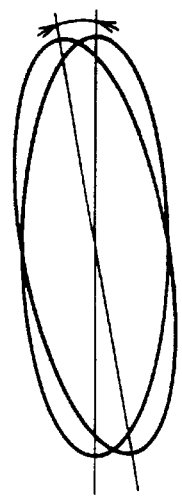
FIG. 43B shows the polarization direction of a laser beam emitted from the laser element of FIG. 43A.

In the above-described embodiment, semiconductor laser 1 includes a sub-mount 104 having a horizontal main plane as shown in FIG. 43A, and a laser element 102 mounted on the main plane of sub-mount 104. A laser beam of 630–640 nm from emission 103 of laser element 102 that is polarized in a vertical direction on the drawing sheet is emitted in a direction perpendicular to the paper surface. In practice, a laser beam is polarized in a direction offset by 4–10°, typically 5–7° from the vertical direction in the drawing sheet as shown in FIG. 43B. Polarization plane rotating unit 4 and polarizing filter 5 may not function appropriately if a laser beam generated by semiconductor laser 1 is not polarized in a desired direction.

Figure 44A:
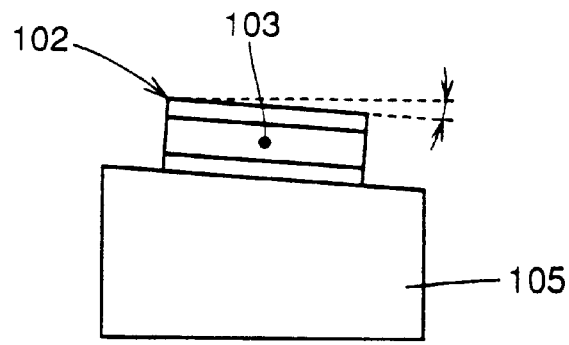
FIG. 44A is a top plan view showing a structure of a semiconductor laser in an optical disc recording/reproduction apparatus according to an eighteenth embodiment of the present invention.
Figure 44B:
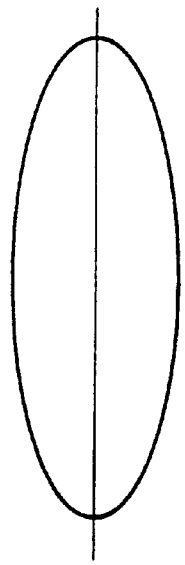
FIG. 44B shows the polarization direction of a laser beam emitted from the laser element of FIG. 44A.

Thus, a semiconductor laser according to an eighteenth embodiment of the present invention includes a sub-amount 105 having a main surface inclined 4–10°, preferably 5–7° from the horizontal direction, and a laser element 102 mounted on the main plane of sub-mount 105 as shown in FIG. 44A. Accordingly, the semiconductor laser can generate a laser beam that is polarized in a vertical direction in the drawing shown in FIG. 44B. Therefore, polarization plane rotating unit 4 and polarizing filter 5 can function appropriately. When polarization plane rotating unit 4 does not rotate the plane of polarization of the laser beam, the polarization direction of the laser beam incident onto the optical disc matches the track running direction of the optical disc. In contrast, when polarization plane rotating unit 4 rotates the plane of polarization of the laser beam, the polarization direction of the laser beam incident onto the optical disc matches the tracking direction of the optical disc (a direction perpendicular to the track running direction). It is preferable to adjust the arrangement of the laser appropriately by inclining the main surface of sub-amount 105.

As an alternative to inclining the main surface of sub-mount 105, the polarization direction offset of the laser beam can be compensated for by mounting a laser element 102 on a horizontal main surface of a sub-mount 104, and rotating the entire semiconductor laser by 4–10°, typically, 5–7°, about the optical axis.

Figure 45A:
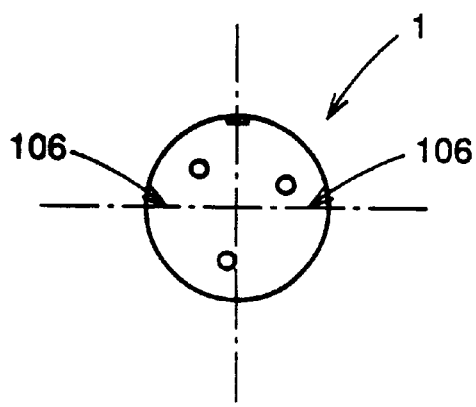
FIG. 45A is a bottom plan view showing a typical arrangement of a semiconductor laser of FIG. 2.
Figure 45B:
FIG. 45B shows the polarization direction of a laser beam emitted from the semiconductor laser of FIG. 45A.

More specifically, a container of semiconductor laser 1 includes two notches 106 formed in a direction parallel to the main surface of sub-mount 104, as shown in FIG. 45A. Therefore, semiconductor laser 1 that should generate a laser beam polarized in a vertical direction on the drawing sheet actually generates a laser beam that is polarized in a direction offset by 4–10°, typically 5–7° from the vertical direction on the drawing sheet, as shown in FIG. 45B.

Figure 46A:
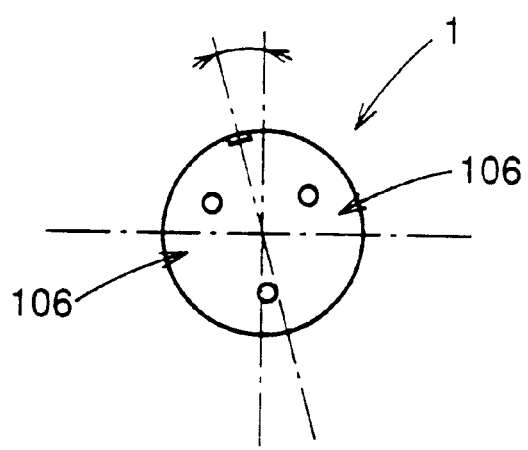
FIG. 46A is a bottom plan view showing an arrangement of a semiconductor laser in an optical disc recording/reproduction apparatus according to the eighteenth embodiment of the present invention.
Figure 46B:
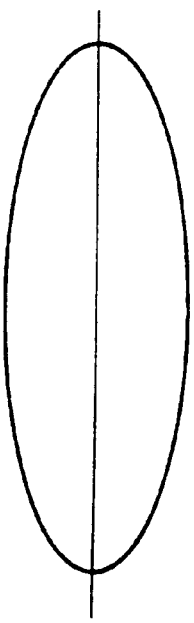
FIG. 46B shows the polarization direction of a laser beam emitted from the semiconductor laser of FIG. 46A.

In order to compensate for this offset in the polarization direction of a laser beam, laser beam 1 is rotated about the optical axis by 4–10°, typically 5–7° from the vertical direction in the drawing. Polarization plane rotating unit 4 and polarizing filter 5 can function appropriately by virtue of this semiconductor laser 1 generating a laser beam that is polarized in a vertical direction on the drawing as shown in FIG. 46B. As a result, when polarization plane rotating unit 4 does not rotate the plane of polarization of the laser beam, the polarization direction of the laser beam incident upon the laser disc matches the track running direction of the optical disc. When polarization plane rotating unit 4 rotates the plane of polarization of the laser beam, the polarization direction of the laser incident on the optical disc matches the tracking direction of the optical disc. It is preferable to adjust the arrangement of semiconductor laser 1 appropriately by rotating semiconductor laser 1 about its optical axis.

Since offset in the polarization direction of a laser beam having a wavelength of 630–640 nm is compensated for in the present eighteenth embodiment, jitter of the reproduction characteristics of an optical disc is improved by approximately 1%.

Nineteenth Embodiment

Figure 47A:
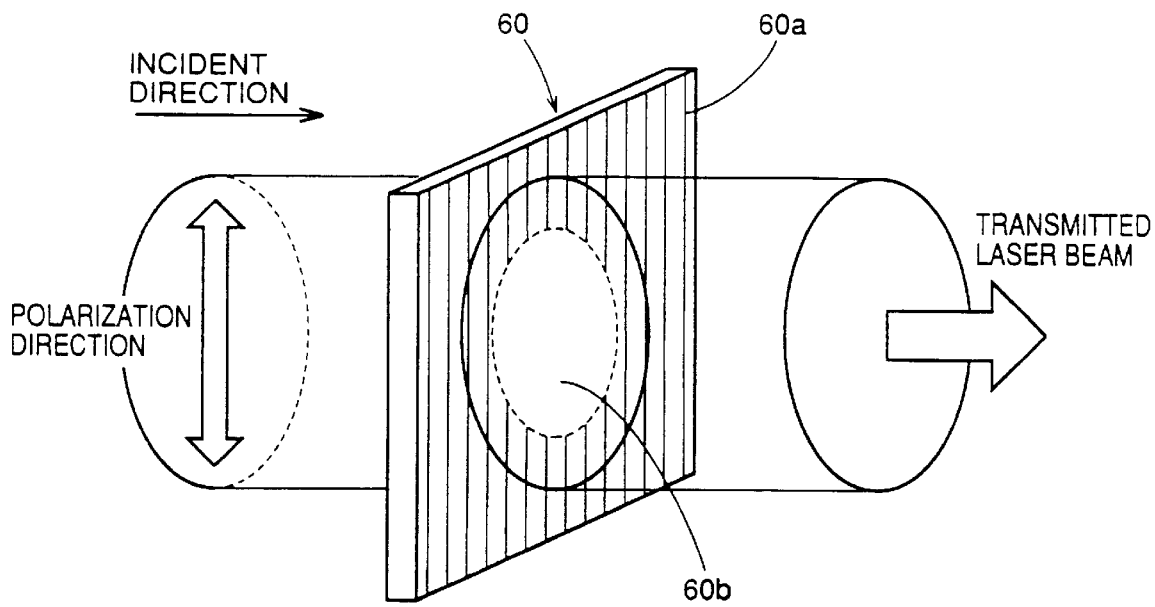
FIGS. 47A and 47B are perspective views of a diffraction grating having polarization selectivity in an optical disc recording/reproduction apparatus according to a nineteenth embodiment of the present invention.
Figure 47B:
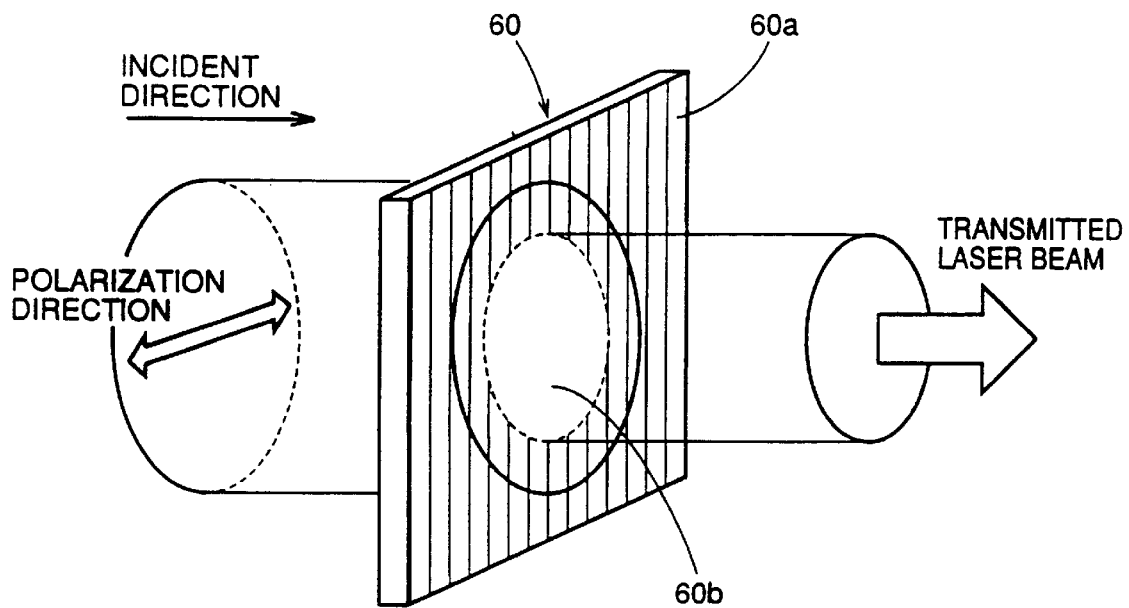

In the above-described embodiments, a polarizing filter 5, a hologram element with polarization characteristics, or polarizing glass is used as the element for intercepting the outer side portion of a laser beam. Alternatively, a diffraction grating 60 with polarization selectivity as shown in FIG. 47A and 47B can be used. Such a diffraction grating passes through a laser beam that is polarized in a predetermined direction, and diffracts a laser beam that is polarized in other direction outwards.

Referring to FIGS. 47A and 47B, diffraction grating 60 is formed of a peripheral portion 60*a* with polarization characteristics in a vertical direction on the drawing, and a central portion 60*b* without polarization characteristics. When a laser beam that is polarized in a direction identical to that of the polarization characteristics of peripheral portion 60*a* of diffraction grating 60 enters grating 60, the laser beam entirely passes through diffraction grating 60. When a laser beam that is polarized in a direction perpendicular to that of the polarization characteristics of peripheral portion 60*a* of diffraction grating 60 enters grating 60 as shown in FIG. 47, the outer portion of the laser beam is intercepted by peripheral portion 60*a*, and only the central portion of the laser beam passes through diffraction grating 60. Thus, diffraction grating 60 functions similar to the above-described polarizing filter 5, a hologram element with polarizing characteristics, or polarizing glass.

Twentieth Embodiment

It is extremely important from the standpoint of recording/reproduction characteristics of an optical disc to seal liquid crystal 44 of polarization plane rotating unit 4 critically between two parallel transparent electrode plates 45. In general, a spherical spacer of approximately 5–7 μm in diameter is mixed into liquid crystal 44 for the purpose of setting the two transparent electrode plates 45 parallel. However, there is a possibility of the mixed spacer adversely affecting the laser beam to degrade the recording/reproduction characteristics.

Figure 48A:
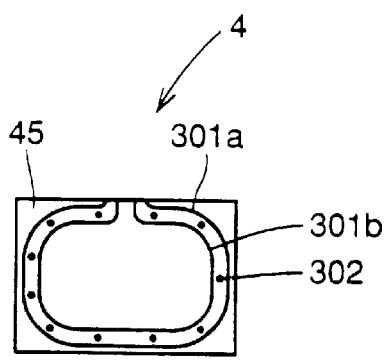
FIG. 48A is a top plan view showing a polarization plane rotating unit in an optical disc recording/reproduction apparatus according to a twentieth embodiment of the present invention.
Figure 48B:
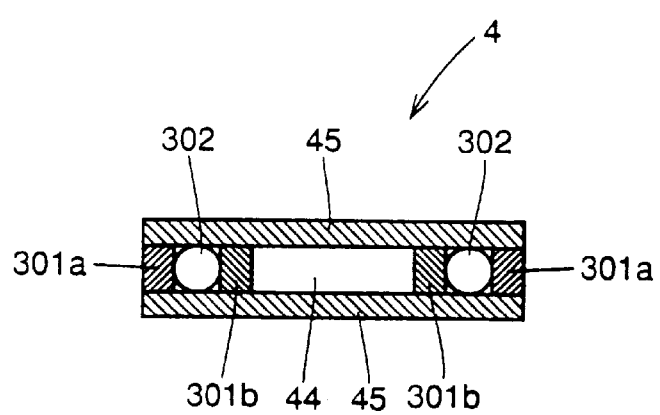
FIG. 48B is a sectional view of a polarization plane rotating unit shown in FIG. 48A.

In the twentieth embodiment shown in FIG. 48A, spacer 302 is not mixed into the region of liquid crystal 44 through a which a laser beam is transmitted. Spacer 302 is mixed into other regions. In polarization plane rotating unit 4 of the present embodiment, sealing materials 301*a* and 301*b* are provided to prevent spacer 30 from moving towards the central region thereof. Spacer 302 is inserted between sealing materials 301*a* and 301*b*. Spacer 302 has a diameter of 4–10 μm, preferably 5–7 μm, and is sealed within a gap between two transparent electrode plates 45 as shown in FIG. 48B. Accordingly, two transparent electrode plates 45 are maintained in parallel.

According to the twentieth embodiment of the present invention, degradation in recording/reproduction characteristics is prevented since a spacer is not mixed into the central region of liquid crystal 4.

The spacer is not limited to the configuration shown in FIGS. 48A and 48B as long as the spacer remains only within the peripheral region of polarization plane rotating unit 4. Spacer is not limited to a sphere, and may be have a rod shape formed of fiber, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disc recording/reproducing apparatus for recording and/or reproducing information to/from a first optical disc and a second optical disc having a substrate thinner than that of said first optical disc, said optical disc recording/reproducing apparatus comprising:

a laser for generating a laser beam, an objective lens for focusing said laser beam from said laser onto said second optical disc, a liquid crystal element through which said laser beam is passed with its plane of polarization rotated in reproducing from said first optical disc, and through which said laser beam is passed without its plane of polarization rotated in reproducing from said second optical disc, and blocking means for blocking an outer side portion of said laser beam passing through said liquid crystal element in reproducing from said first optical disc.

* * * * *